ent Number: 4,853,843
Date of Patent: Aug. 1, 1989

United States Patent [19]
Ecklund

[54] SYSTEM FOR MERGING VIRTUAL PARTITIONS OF A DISTRIBUTED DATABASE

[75] Inventor: Denise J. Ecklund, Beaverton, Oreg.

[73] Assignee: Tektronix, Inc., Beaverton, Oreg.

[21] Appl. No.: 136,174

[22] Filed: Dec. 18, 1987

[51] Int. Cl.[4] .............................................. G06F 15/20
[52] U.S. Cl. ................................. 364/200; 364/282.1; 364/282.4; 364/300
[58] Field of Search ... 364/200 MS File, 900 MS File, 364/200, 900, 300

[56] References Cited

U.S. PATENT DOCUMENTS

| | | | |
|---|---|---|---|
| 4,432,057 | 2/1984 | Daniell et al. | 364/200 X |
| 4,511,964 | 4/1985 | Georg et al. | 364/200 |
| 4,558,413 | 12/1985 | Schmidt et al. | 364/200 X |
| 4,635,189 | 1/1987 | Kendall | 364/300 |
| 4,648,036 | 3/1987 | Gallant | 364/300 |
| 4,686,620 | 8/1987 | Ng | 364/300 X |
| 4,769,772 | 9/1988 | Dwyer | 364/200 X |

OTHER PUBLICATIONS

"Robustness in Distributed Hypothetical Databases" by D. Ecklund, published 1985 in Proceedings of the Nineteenth Hawaii International Conference on System Sciences.

*Primary Examiner*—Eddie P. Chan
*Assistant Examiner*—Paul Kulik
*Attorney, Agent, or Firm*—Daniel J. Bedell; Robert S. Hulse

[57] ABSTRACT

An object-oriented, distributed data base system separates into a plurality of virtual partitions following communication failure between sites accessing the data base. Each partition accesses a separate copy of an initial data base and independently updates groups of data objects included in the data base to add new versions of data objects to the data base. Each virtual partition maintains a copy of all previous versions of data objects and maintains a change list describing all group updates that it executes. Following restoration of communication between sites, each virtual partition merges the data bases maintained by separate partitions to form a consistent merged data base permitting versions of data objects and collections of data objects created by any one of the separate virtual partitions to be identified and accessed in the merged data base.

18 Claims, 9 Drawing Sheets

Original Common State x1   x2   x3

View in Partition P1 x1   x2   x3

View in Partition P2 x1   x2   x3

Merged Result x1   x2   x3 a1

SYSTEM FOR MERGING VIRTUAL PARTITIONS OF A DISTRIBUTED DATABASE

BACKGROUND OF THE INVENTION

The present invention relates in general to an optimistic, robust, distributed data base system, and in particular to a system for merging virtual partitions in a distributed data base system.

The purpose of a database system is to reliably store data and to process valid, authorized read and write requests on that data. A database system provides a uniform interface for accessing data by executing transactions. A transaction is a unit of work comprising a sequence of steps required to achieve some goal. Each transaction consists of an inhibition phase; a read, compute, and write phase; and a commit phase. In the initiation phase, the transaction is authenticated and assigned some priority for being executed. In the read, compute, and write phase, the transaction carries out the requested action. The commit phase installs all of the results written by the transaction into the database making them visible to other transactions.

The purpose of a "distributed" database system is to provide global database service to users at a collection of sites. A distributed database system is a coalition of sites that share access to a set of data. Each site maintains directory information about the data so that each site has knowledge of all data stored by the database system. Copies of the data itself are distributed among the sites. The sites are connected by a communication network consisting of some physical communication medium and a communication protocol for controlling communication over that medium. This basic communication protocol is part of the network services of an operating system.

A distributed database must, under normal operating conditions, maintain internal and mutual consistency of the data stored by the system. Internal consistency is maintained if all database updates performed by committed transactions are reflected in the database, none of the updates performed by the uncommitted transactions are reflected in the database, and no transaction is allowed to read a data value written by another transaction that is not yet committed. A distributed database system maintains mutual consistency of the database if given a data item, all replicated copies of the data item are the same. Mutual consistency is defined to mean, "all copies converge to the same state and would be identical should update activity cease".

A "robust" distributed database system is one that processes transactions and preserves internal and mutual consistency even when system components have failed. There are a number of types of component failures. A "site crash" is a machine failure due to loss of power, operating system deadlock or panic, processor malfunction, or human intervention to restart a site. A "network partition" occurs when two or more groups of sites are running but are unable to communicate. "Media failure" occurs when a storage device fails while reading or writing data, rendering some portion of the stored data unreadable. "Software failure" occurs when the internal consistency or the mutual consistency of the database has been compromised due to an error in the implentation of the database system or due to the occurrence of failure types not managed by the protocol implemented by the software.

Preserving internal consistency in the event of failures requires some mechanism for undoing results written by uncommitted transactions and ensuring the results written by committed transactions are reflected in the database. Preserving mutual consistency in the event of failures in the distributed environment requires that all sites acquire knowledge of new data items and new values for existing data items in as timely a manner as possible.

A "robust" system should provide users with continuous service while maintaining internal consistency and mutual consistency of the database. The traditional approach to building a robust system has been to extend failure free protocols for maintaining internal consistency and mutual consistency. However, degrees of robustness can be gained only at considerable cost in time and storage space. In addition, a system can be robust only in the event of failures it can detect and have anticipated detecting.

A robust distributed data base system is described in the paper "Robustness in Distributed Hypothetical Databases" by D. Ecklund, published 1985 in *Proceedings of The Nineteenth Hawaii International Conference on System Sciences*, and incorporated herein by reference. The system described in this paper establishes "virtual partitions" after system component failure prevents communication between various sites. Each virtual partition is a collection of sites that have access to a copy of the data base and which can still communicate with each other. The sites in each virtual partition continue to read and write access their copy of the data base even though they cannot communicate those changes to other sites in the system. The described system can support robust optimistic access control because under normal processing conditions the system ignores the possibility of update conflicts until they actually occur. If a failure partitions the network, the system may unknowingly process conflicting updates in separate partitions. In some sense the system ignores these conflicts until the failure is repaired and the partitions are brought back together. When the partitions are merged, the conflicting updates occur but are managed by implicitly deriving alternate versions. The general philosophy is that the results of conflicting updates will be by allowing one result to prevail over another.

However, the system described in the above mentioned paper is unsuitable for merging partitions in a hierarchical data base system wherein groups of data objects are grouped into "configurations" that themselves have version histories. While the system can resolve conflicting updates of low level data objects, it is unable to resolve conflicts between updates of configurations so as to provide a consistent version history of each configuration.

SUMMARY OF THE INVENTION

A data base system provides a plurality of separate virtual partitions, each storing separate instances of an initial data base. The data base comprises an initial set of versions of data objects, each version of a particular data object, other than a first version of the data object, being created by modifying an existing version of the data object. The initial data base also includes an initial set of directory data associated with each data object, the directory data identifying non-overlaping "paths of descendancy" for the associated data object, wherein each path of descendancy comprises sequentially created versions of the data object. Each data object version included in a path, except a first data object version of the path, directly descends from a last created data object version of the path. The directory data classifies each path as one of "principal" and "alternate", and classifies each version of each path as being one of "current" and "non-current". However, one and only one path of each object is classified as "principal" and one and only one version of each path is classified as "current".

The initial data base further includes an initial set of configuration specifications, each configuration specification referencing a group of the initial set of data object versions including floating references to a "current" data object version of a "principal" path of a data object.

Each virtual partition independently executes group updates, each group update carrying out at least one of a set of operations with respect to a group of objects referenced by a configuration specification. A group update may, for example, add a new version of a data object to a path, alter classifications of paths, and/or alter classification of data object versions. Each virtual partition maintains a separate change list describing all group updates that it executes.

In accordance with the invention, each virtual partition may provide a merged data base reflecting changes to the initial data base resulting from all group updates described by change lists maintained by the separate virtual partitions. The merged data base maintains internal and mutual consistency for all objects and configurations.

To form the merged data base, a virtual partition first obtains the change lists maintained by the separate virtual partitions. The partition then selects a collection of group updates from among all group updates described by the change lists according to predetermined selection criteria, for example, to maximize the number of group updates in the collection. However, selection of group updates is subject to a restriction that the collection cannot include group updates described by differing change lists of the separate virtual partitions when the group updates alter the same data object path. The virtual partition then executes the collection of group updates in sequence with respect to the initial set of data objects to produce a resulting set of data objects. Finally, the partition adds additional data object versions to alternate paths of the data objects, each additional data object version resulting from group updates described by change lists other than group updates included in the collection.

It is accordingly an object of the invention to provide a method for merging copies of a distributed data base that have been independently updated by separate virtual partitions so as to preserve internal and mutual consistency of the data base.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

BRIEF DESCRIPTION OF THE DRAWING

FIG. 4 is a block diagram of the federations Big, Little, and Little of FIG. 3 with site C enrolling in the federation named Little that site A belongs to;

DESCRIPTION OF THE PREFERRED EMBODIMENT

Figure 1:
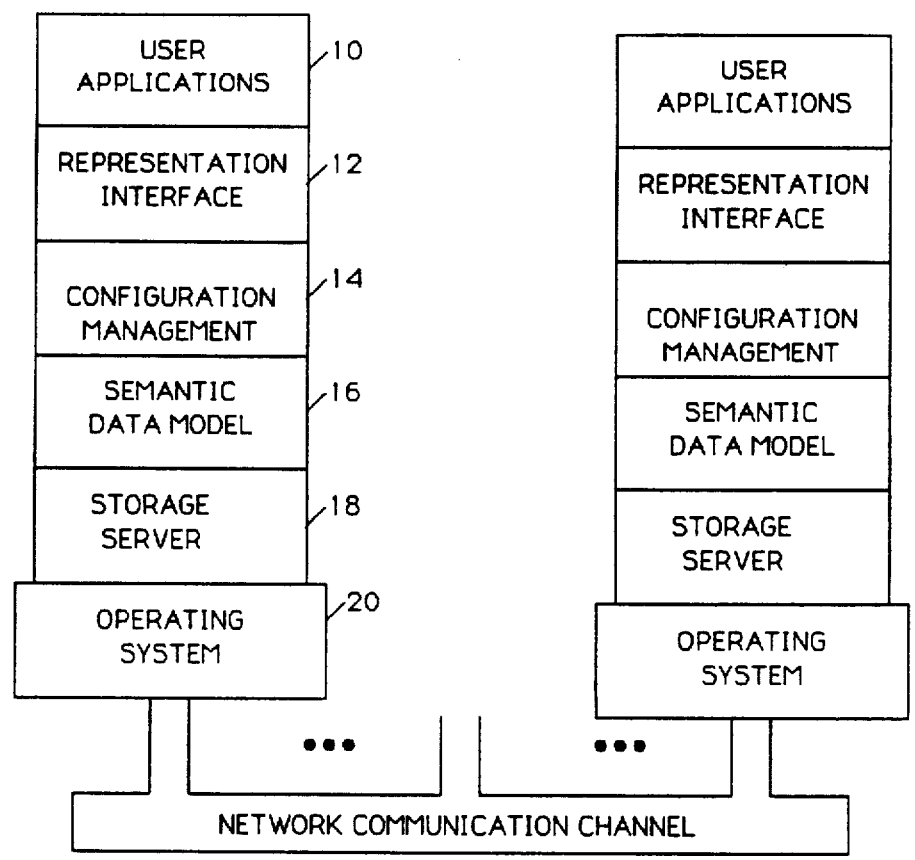
FIG. 1 is a block diagram of a five layer software architecture for a CAE data base system.

The present invention is a distributed data base system that has application, for example, in conjunction with a large computer-aided engineering (CAE) project in which many project teams at separate locations must read and write access a common data base. FIG. 1 shows a five layer software architecture for a CAE data base system. Each layer provides services to the layers above.

A user applications layer 10 is a collection of CAE tools such as a graphic editor, a design rule checker, and a simulator. A representation interface layer 12 is concerned with the mapping between internal and external format of the design data stored by the system. A configuration management layer 14 builds a single complex entity called a "configuration" by selecting and combining versions of subcomponents of the entity. At a semantic data model layer 16, an object-oriented data model is used to enforce consistency of the design. A distributed storage server layer 18 provides reliable storage of the design data. Below the storage server layer is a local operating system 20.

Users interact with the layered system by executing a tool program. The tool program asks the database system for access to a copy of the design the user wishes to work on. When a request for data is received, the configuration management layer 14 determines exactly which pieces of data are being requested. The storage server layer 18 locates and provides the requester with a private copy of each data item. The representation interface layer 12 converts the data to the format appropriate to the requesting tool and the user than works with his copy of the data using the operations provided by the tool program. When all user modifications have been completed, the tool requests that the database system store the revised design in the database. The representation interface layer 12 formats the external representation of the revised design into its corresponding internal format. The configuration management layer 14 determines which subcomponents have been modified, and if necessary, modifies the configuration definition. The semantic data model layer 16 certifies the modified design by invoking appropriate consistency checking programs. Once the modified design has been certified it is stored in the database.

Figure 2:
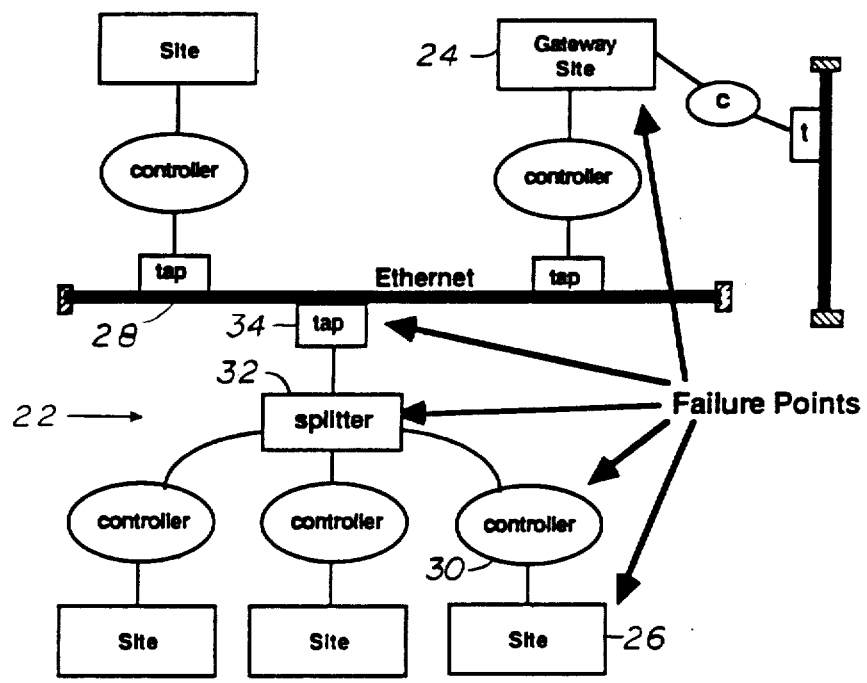
FIG. 2 is a block diagram of a CAE database environment with multiple local area networks connected by gateway sites.

FIG. 2 shows a suitable CAE database environment with multiple local area networks 22 connected by gateway sites 24. Each local area network connects a number of machines at sites 26. Project teams of engineers spread over the network access the system through a workstation in their office or through a larger machine.

The communication medium for each local area network (LAN) is an Ethernet 28. ("Ethernet" is a registered trademark of Xerox Corporation.) An Ethernet provides broadcast communication among the sites connected to it. Messages are received in the order they are sent and the non-deliverability of a message is reported to the sender. Each site has a network controller 30 which receives messages broadcast over the Ethernet medium. In order to maximize the number of sites connected to a single Ethernet 28, some controllers are connected to a splitter 32 that passes incoming messages from the Ethernet on to all attached controllers 30. When a site 26 sends a message, the message is sent by the controller 30 through the splitter 32 and out onto the Ethernet 28. Every network controller 30 must be connected to a splitter 32 or an Ethernet tap 34.

Each Ethernet tap 34, each splitter 32, each network controller 30, and each site 26 is a possible failure point in the environment. A "site failure" is a site crash followed, at some time in the future, by a restart of that site. A failed site may also have experienced a media failure due to the site crash. Permanent removal of a site is also possible.

If a controller 30 fails, the site 26 connected to that controller cannot communicate with the remainder of the network. This single site forms one physical partition and the remaining sites form another. The sites that continue to communicate are unable to determine if the failed site has crashed or has been partitioned by a communication failure.

If a splitter 32 or a tap 34 fails, each site connected to the Ethernet 28 by that tap or splitter becomes a single site partition and the remaining sites form another physical partition. It is important to note that a splitter generally has no local loop-back capabilities. Two sites attached to the same splitter can communicate with each other only by sending a message out over the entire Ethernet proper. Thus, if a splitter 32 fails, each site connected to the Ethernet through the splitter forms a single isolated partition.

A site that connects multiple local area networks is called a gateway site 24. If a gateway site 24 fails, two partitions are formed. We call such partitions "probable partitions". An important characteristic of a probable partition is that the maximum set of sites that will be members of the partition is already known.

FEDERATIONS

In order for users to interact with each other and to share their data a global mechanism is provided for organizing users and data in a meaningful way. A "federation" is such a mechanism. A federation is a loosely associated collection of sites, users, and the data they share. Formally, a federation is defined by an ordered triple <O, S, U>, where O is the set of objects in one scheme defined by the data model, S is the set of sites that belong to the federation, and U is the set of users who belong to the federation. Hereinbelow, the term "user" and the term "client" shall be used interchangeably and will refer to the upper layers of the database system which act as clients to the storage system.

If one user at a site is a member of a federation, that site is also a member of that federation. A user may be a member in any number of federations. Membership in a federation is associated with permission to access the data stored in that federation. A user may be an associate member or a participating member. A "participating" member may modify the database by creating or updating entities in the object set. Each entity created is owned by the creating user. Associate members can only read the objects stored by the federation. Sites also hold participant or associate status. If any user at a site is a participating member of a federation, that site is a participating member of that federation.

Figure 3:
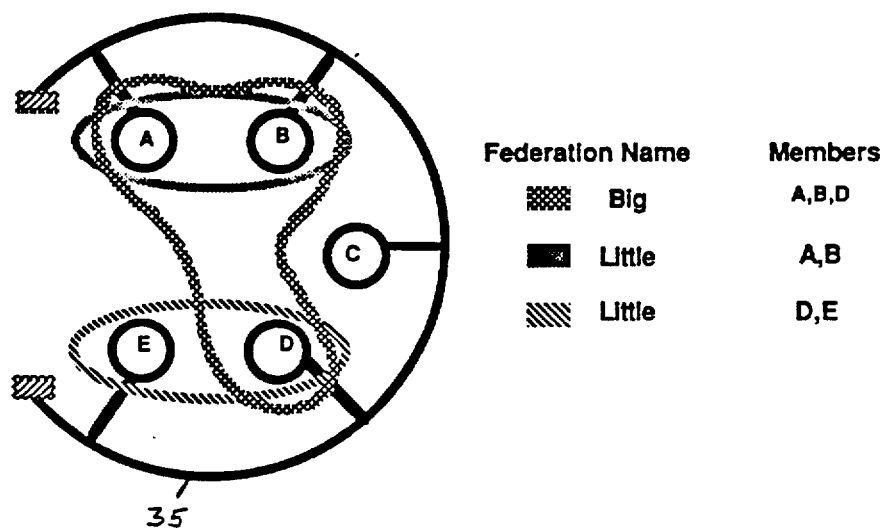
FIG. 3 is a block diagram of sites A, B, C, D, and E connected by a local area network and grouped into the federations named Big, Little, and Little.

All sites belonging to a federation maintain fully redundant direction information about the sites, users, and data objects in that federation. Participating sites maintain copies of the data extensions for the set of objects. For reliability, multiple sites may store full copies of the data extensions. Each federation has an associated name that may or may not be unique, and a federation is named when it is defined by one user at one site. There is no meta-federation name server to approve federation names, hence users at other sites may define distinct federations having identical names. By way of example, FIG. 3 shows sites A, B, C, D, and E connected by a local area network 35 and grouped into the federations named Big, Little, and Little.

FEDERATION MANAGEMENT

User initiated actions and environmental system failures may at any moment cause changes in the active structure of a federation. The user initiated operations which affect the set of sites and the set of users in a federation are "define", "enroll", and "secede". A user may define a new federation on the local site, enroll in a federation which exists on another site, or secede from a federation in which the user is currently a member. The execution of each of these operations may be affected by site crashes and network partitions.

"Define" is a user initiated operation which creates a new federation. The initiating user must give a name to the federation being created. This proposed federation name must be a unique federation name on the local site. If the local site already belongs to a federation of the specified name, the new federation cannot be defined and the user is informed. If the federation name is unique, a new scheme <O, S, U> is created. The site set contains the local site, and the user set contains the initiating user. The local site becomes the designed name server site for the new federation. The user and the local site are automatically considered to be participating members in the new federation. The object set is initially empty. Optionally the defining user may specify a default replication factor for the object set of the new federation.

Figure 4:
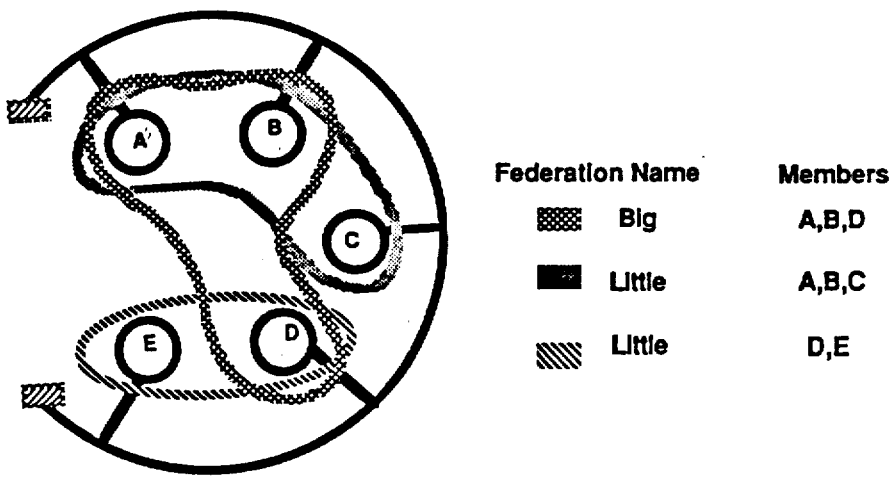

The "enroll+ operation allows a user to join an existing federation. If the site local to that user does not currently belong to this federation, the site is enrolled also. The user initiating the enroll must give the name of the federation which is to be joined, the name of a site known to belong to that federation, and the participation mode the user wishes to enroll under. It is necessary for the upper layers to provide the name of a remote site in an enroll request due to the possibility of duplicate federation names. In such case, the distributed nature of the storage system is seen by the upper layers of the system. FIG. 4 shows the federations Big, Little, and Little of FIG. 3 with site C enrolling in the federation named Little that site A belongs to. A successful execution of the enroll operation will result in the initiating user being added to that federation's set of users. If the local site was not a member of the federation at the time of the enrollment, the local site will be added to that federation's set of sites. Since the local site will not have a directory for federations to which it does not belong, a copy of the directory for this federation is obtained.

An enroll operation may fail for many reasons. It is possible that the local site and the specified site already belong to different federations of the same name. In this case, it is impossible for the user to enroll in the desired federation. The enroll operation will also fail if the specified site can not be reached due to nonexistence of the specified site, or due to a site failure, or a network failure. In such a case, the user may try specifying another site, if another site is known to belong to the desired federation.

The "secede" operation is used when a user wishes to withdraw from a federation. A user may secede from a federation only if he is no longer the owner of any entities of the object set. If all of the local users of a federation secede from that federation the site also secedes from that federation. The seceding site is obliged to retain all redundant copies of object data and sufficient directory information to access these copies until they have migrated or have been archived on a remote dedicated device.

STRUCTURE OF THE STORAGE MODEL

Ecklund and Price proposed a single site storage model for the object set of a federation in "Multiple Version Management of Hypothetical Databases" published 1985 in *Proceedings of The Nineteenth Hawaii International Conference on System Sciences*, which paper is incorporated herein by reference. The storage model reflects all of the features critical to data management in any team design environment: support for a high degree of data sharing; mutual consistency of sets of data objects; storage and retrieval of temporal versions of data objects; and creation; storage, and retrieval of alternate versions of data objects. Ecklund et al. proposed a distributed hypothetical storage server (DHSS) as an extension of the single site storage model in "Federations: Scheme Management in Locally Distributed Databases", published 1985 in *Proceedings of The Nineteenth Hawaii International Conference on System Sciences*, which paper is incorporated herein by reference. The present invention is embodied as an improvement to the DHSS, the improved distributed hypothetical storage server hereinafter referred to as "IDHSS".

Figure 5:
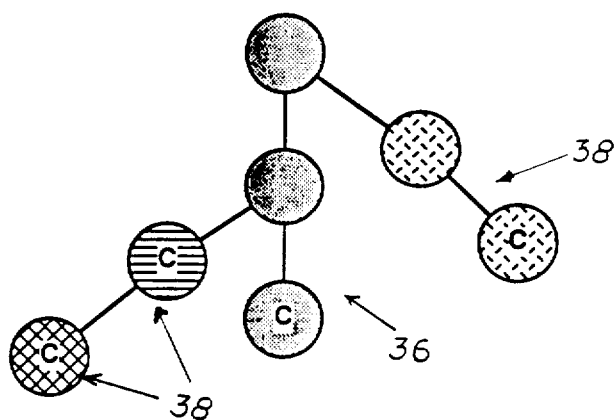
FIG. 5 is a graphical view of a data object containing four version paths.

IDHSS tracks the evolution of a design, storing and maintaining access to temporal and hypothetical versions of each design. The use of hypothetical versions allows a designer to investigate alternate but related designs. Each alternate version is related to either the principal version of a design or to an alternate version of the same design. This means that at the configuration management layer, each entity maps to a design component and at the storage layer that design is represented by IDHSS as a "tree" of instantiations. Such a tree is called a "IDHSS object". The root of the tree is the first instantiation (first version) of the design to be stored in the system. One path in the tree is denoted as the principal path on instantiations along this path correspond to each recorded update of the principal design (i.e., successive temporal versions of the principal design). Every other path in the tree corresponds to an alternate design; the instantiations along such an alternate path are the temporal versions of the alternate design. For each path in the tree there is a distinguished node which corresponds to the "current" version (with respect to time) in that path. FIG. 5 shows a IDHSS object containing four version paths, the principal path 36 and three alternate paths 38. Current versions of each path are labeled with a "C".

The IDHSS data base consists of a collection of IDHSS objects.

OBJECT NAMING

IDHSS supports a name mapping facility to associate an object name with a version of an object. When a IDHSS object is created by a client, that client must provide a unique name to be associated with the object. Each federation has a designed name server site. The function of the name server is to certify, within the federation, the uniqueness of each user-defined object name.

The storage server will map an object name first to a tree of instantiations and then to the particular representative in the tree that is the current version in the principal path. As alternate paths are created, each path is assigned a number called its "implicit alias". The implicit alias numbers are assigned within each tree in the order in which the alternate paths are created. Alternate paths may be named directly by the client or may be referenced by their object name and implicit alias. Non-current versions are referenced by appending a time specification to a valid name. The specified time being the time at which the node instance was the current instance. Names without a time modifier are called "floating references" as the mapping function will map them to the current instance of some path and which instance is current changes over time. Names with time modifiers are "fixed references". This naming scheme allows the client to specify any version in a tree of instantiations.

The following Table I presents the object base name references and the mapping performed by the storage server:

TABLE I

A valid object base name is of the following form:

"Entity__Name"
    refers to the representative that is the current version of the entity.

"Entity__Name[time]"
    refers to the version of the entity that was current at the specified time. A valid Entity__Name is of the following forms.

"Object__Name"
    refers to the representative that is the current version on the principal path of the object.

"Alternate__Path__Name"
    refers to the representative that is the current version of an alternate path.

"Object__Name(i)"
    where i is the implicit alias, refers to the current version of the ith alternate path created in the object named.

A valid Object__Name or Alternate__Path__Name is an ordered concatenation of from one to three name parts separated by the symbol " ".

"user__defined__name"
    the strings of symbols, excluding " ", as specified by a user.

"user__name"
    the name of the user who specified the string.

"site__name"
    the name of the site on which the string was specified.

Object names and path names are flat space names decomposable into three parts: a user-defined name, a user name, and a site name. The goal of a flat name space is to ensure that the user-defined portion of a name is unique. A user works under the assumption that the user-defined name is unique and can ignore the existence of the suffixed portions of the name.

BASIC ACCESS CAPABILITIES

IDHSS provides basic access to the IDHSS database through a "checkout/checkin" paradigm. Execution of a "checkout" gives the client local copies of a set of instantiations. The end-user is then free to modify each copy in an appropriate manner. (The tool program and the data model are responsible for monitoring and maintaining the semantics of the user's individual actions on the design data.) Once the end-user's copy of the design has again reached a consistent state (as deemed by the data model), the client may "checkin" the updated design. Checkin adds new current instances to the appropriate set of paths in a set of IDHSS objects.

Figures 6A, 6B:
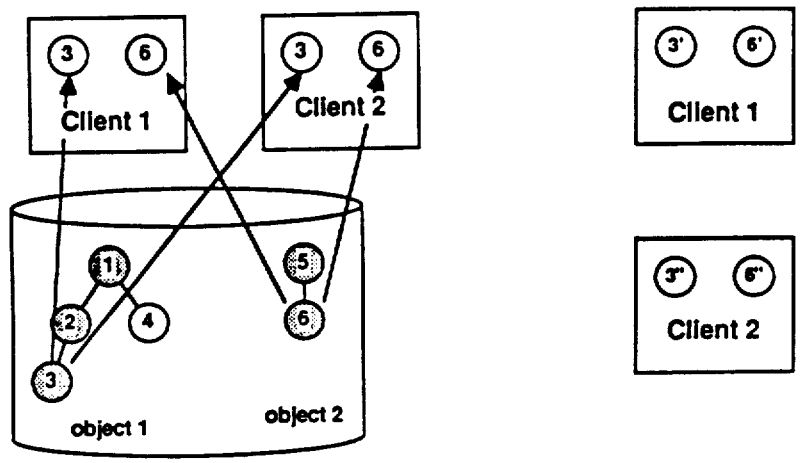
FIG. 6A is a block diagram of two clients performing a duplicate checkout of the current version of two data objects.
FIG. 6B is a block diagram of the independent modification of the checked out data by the two clients of FIG. 6A.
Figure 6C:
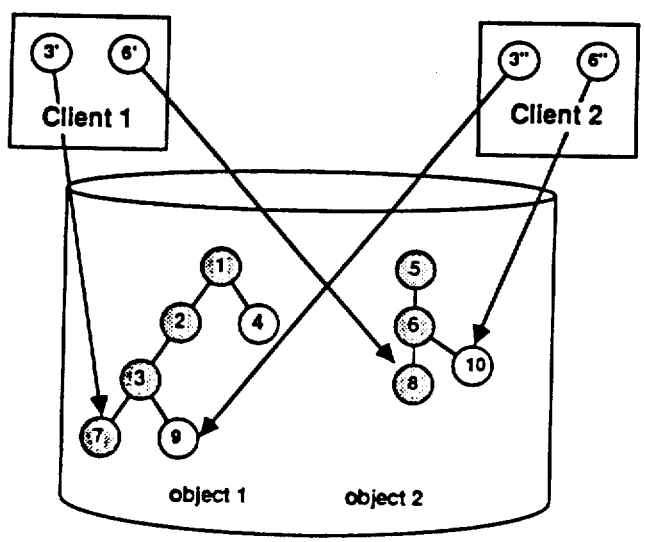
FIG. 6C is a block diagram of the results produced by the checkin of the new versions by the two clients of FIG. 6B.

Checkout is a "multi-reader" request. Multireader is implemented by not setting a lock at the time of the checkout and providing each requesting client with a separate copy of the data. Checkin is a "multi-writer" request. Multi-writer means that every successful checkout may be followed by a checkin that will be accepted and saved by the storage system. If multiple checkouts have been performed on an object, the first checkin executed will result in a successful update of the object. Subsequent checkins will result in the creation of alternate but related versions of the object. FIG. 6A shows two clients performiong a duplicate checkout of the current version of two IDHSS objects, FIG. 6B shows the independent modification of the checked out data, and FIG. 6C shows the results produced by the checkin of the new versions. Versions included in the principal path of an object are shaded.

For a user, the checkout-checkin sequence represents one user transaction. At the storage layer, two transactions are executed, first a checkout (read) and then a checkin (write). A transaction instance is a unit of locking and recovery. The storage system does not hold locks on data while it is checked out, thus no storage system transaction is in progress during that time. IDHSS supports the atomicity of storage layer transactions only. That is, either all results of the transaction will be in effect or none of the effects of the transaction will prevail. Support for the atomicity of user level transactions is handled by the layers above the storage system through the use of inverse storage system requests.

DATA MANIPULATION IN IDHSS

IDHSS supports a number of client requests for creating and manipulating IDHSS objects. We assume a session interaction model where the client opens and closes existing federations, and all intervening requests pertain to data in the object set of the open federation. Hereinbelow are described the requests of interest from the perspective of building a robust IDHSS. The message format for each request type is given using a standard notation for repetition where * means zero or more repetitions and + means one or more repetitions; groupings are enclosed in parentheses (); and optional terms are enclosed in square brackets.

create object__name data__value

A single IDHSS object is created by executing a create request. The request must specify a name for the object and an initial data value for the object. The proposed object name must be unique within the open federation. The name server site for the federation will approve or reject the name based on the grounds of uniqueness. If the object name is approved, the storage server copies the initial data value to stable storage on the local site and add new entries for this object to the system directory. The requesting user will be the owner of the object. The newly created object consists of a single instance that belongs to two paths, the principal path and the path having implicit alias one.

At creation time the new object is assigned an immutable token that is unique system wide. In IDHSS the tokens consist of two parts the name of the site generating the token and a number unique to that site. The local site will be the primary site for the object. The primary site is the control site for the synchronization of future actions on the object.

checkout existing__name*

Execution of a checkout provides the client with a readable copy of the requested data. The checkout request mut specify a set of valid names in the name space of the open federation. IDHSS maps the set of names to a set of data instances and retrieves a readable copy of each of those instances. Information on who requested the checkout and what data was involved is maintained by IDHSS. When data is acquired by a checkout, IDHSS assumes that the data will be copied and modified by the client, and eventually stored in the database via an update request.

update (existing_name new_data_value [replication_factor])*

The update request attempts to add a new temporal version to each specified path. Each update request must have been preceded by a checkout request for the set of paths to be updated. The set of new instance values is copied by the storage system to local stable storage. For each instance in the associated checkout, the primary site for the object containing that instance sets a lock on the object. This allows the updates to be serialized so that the first update based on instance X adds a new instance X' to the path and all subsequent updates based on instance X cause the creation of a new path with instance X as the root of that path. All late updates result in the implicit derivation of an alternate path followed by an update to the new alternate path. The client is notified of all late updates and the implicity alias numbers generated for the new paths.

An update is rejected if any instance in the specified path was not checked out or if the paths being updated were deleted or erased after the data was checked out. A failed update request has no effect on the user's local data copy. The local data may be used to create a new object.

delete object_name

An entire IDHSS object can be removed by executing a delete request. The name of the entity specified in the delete request must be the name of an object rather than the name of a path. The name of a deleted object may not be immediately available for reuse as a unique name. Site or communication failures may require that the physical deletion of all references to the object be delayed. In any case, the object is logically deleted at the completion of the delete request.

erase name option

The erase request removes instances from paths. The two options for erasing are erase one and erase all. The semantics of an erase one request is to remove the current instance in a path reverting to the previous instance as the current. Erase one is implemented as an update of the instance being removed, updating it to be the previous version in that path. This approach insures that there are no time gaps between the temporal versions in a path. Thus, all references to old versions dating back to the time of the creation of the path are well defined.

The erase all request removes all instances in a single alternate path. The principal path cannot be erased. The name of the entity specified in the erase all request must be the name of a path. The name of the erased path may not be immediately available for reuse as a unique name due to postponed physical deletion. The implicit alias number corresponding to the erased path will never be reused.

assign object_name path_name

Execution of the assign request alters the mapping of a IDHSS object name in a manner contrary to the semantics of update. The assign request will force an object name to be mapped to the current instance of a specific path in the tree of instances. Semantically the assign allows the client to select a related alternate version of an object as the principal version of that object.

TRANSACTION PROCESSING IN IDHSS

The storage server is multi-threaded, that is, multiple requests are in a state of execution simultaneously. An interleaved processing of requests is serializable if the results produced are equivalent to some sequential processing of the requests. IDHSS produces a serializable execution of client write requests by employing primary site concurrency control. Each IDHSS object has an associated primary site. The primary site sequences the processing of requests on an object by functioning as a lock server for that object. If a request operates on object O, the requester must obtain a lock on O before the request can be serviced.

Figure 7:
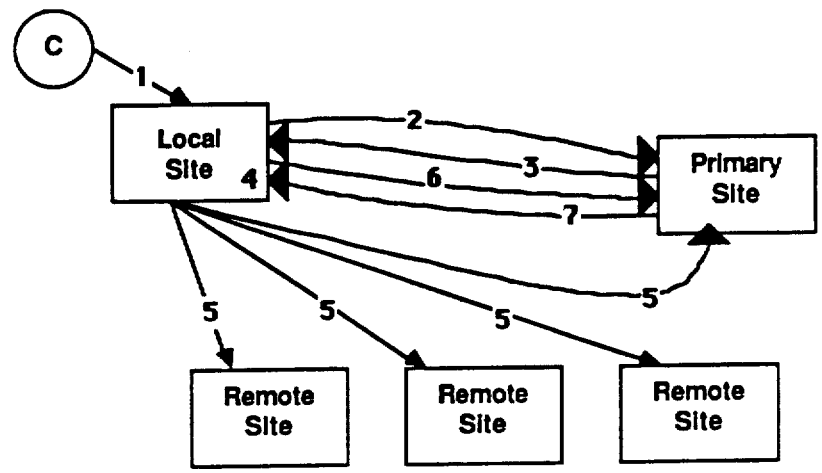
FIG. 7 is a graphical view of steps required in processing a typical write request.

FIG. 7 diagrams the steps required in processing a typical IDHSS write request. The steps are as follows:
1. Receive request from local client.
2. Request object lock from the primary site.
3. Lock is granted.
4. Process and commit the request locally.
5 Multicast the result of the request (one-phase commit).
6. Request that the object lock be released.
7. Lock release acknowledged.

A client's local site must obtain all required locks from the appropriate primary sites before the request can be processed. Once the locks are obtained, the local site's directory contains accurate information on the locked entities. The local site processes the request using the information in the local directory. When the processing is completed the results of the request must be incorporated into the directory of each site in the federation. This is accomplished by sending a multicast message to the subset of sites on the network that belong to the federation of interest. When the remote sites have acknowledged that their processing is complete, the initiating site will release all locks held for the processing of this request.

All IDHSS requests are processed atomically. This means that the results produced by a single transaction are committed to the database before they are seen by any other transaction. Processing of a multicast message is also performed atomically. Atomicity of execution is achieved by establishing for each transaction a separate task that holds all results until the transaction reaches its commit point. Once the commit point has been reached, the task force all results to the disk in one synchronous write. A synchronous write is a blocking event for the entire storage system; thus no storage system processing can proceed before the write completes.

The normal processing protocol illustrated by FIG. 7 maintains the internal consistency and mutual consistency of all sites in the federation. Given that communication or site failures may occur at any step in the processing sequence, this simple protocol is augmented to maintain internal consistency and mutual consistency in the faulty environment.

GROUP TRANSACTIONS

Providing a checkout and checkin facility for single objects is not sufficient support for the upper layers of a CAE database system. The application tool layer and the representation layer work with complex objects which may be decomposed into many sub-objects. Each sub-object is stored as a single IDHSS object. These upper layers will request data in terms of complex objects. The configuration management layer will decompose a complex object request into its many subcomponents in order to provide the higher layer with a configuration of the complex object. A configuration is a version of a complex object and is constructed by combining a version of each subcomponent of the complex object. A "configuration specification" is stored as an object which refers the sub-objects. A configuration specification may make fixed references or floating references to the sub-objects. Fixed references always map to the same version of a sub-object. Floating references map to the version that is current at the time the reference is processed. When a configuration specification contains floating references, the storage system must provide a checkout and checkin facility for groups of objects in order to provide the user with a consistent version of the complex object being operated on. Storage system requests that operate atomically on a group of IDHSS objects are called "group transactions".

CONSISTENCY IN GROUP CHECKOUT

In accordance with the invention, the checkout and update transactions of IDHSS operate on a group of data items from one or more IDHSS objects. The group of instances are the subcomponents in a configuration as referenced by a configuration specification. When a group checkout is executed, IDHSS records the status of each item as either "current of a principal path", "current of an alternate path", or "non-current". Use of a group checkout insures the client of configuration read consistency.

A set of instances is "configuration read consistent" if:
1. the set of instances is specified as a configuration by the configuration management layer; and
2. in the configuration, all instances named by floating reference will be simultaneously current versions.

If a group checkout requesting current instances of a set of objects were carried out as a sequence of singleton checkouts, property 2 of configuration read consistency could be violated. If the local site processes an update affecting those instances yet to be read, the final result of the sequence of reads will not produce simultaneously current versions of the instances. Thus, group checkout is necessary to provide the client with a consistent set of data values. Execution of a group checkout is complicated in that a local site may have to request data copies from several distinct remote sites. Neither local locking nor remote locking is required in the processing of a group checkout because all transactions are executed atomically. This ensures that the local site successfully maps the names in a group checkout to a configuration consistent set of instances.

CONSISTENCY IN GROUP UPDATE

In accordance with the invention, a client may execute a group update only on a set of instances obtained by a group checkout. A group update must maintain the configuration write consistency of the instances being updated. Hereinbelow are defined a set of rules for processing group updates such that adherence to these rules will maintain configuration write consistency among the items in a group update. The intention of the update rules is to form an alternate configuration object when a principal configuration cannot be updated consistently. A modified definition of configuration write consistency and a modified set of update rules may be desired for maintaining configuration write consistency when modeling other applications such as computer-aided software engineering.

For a CAE application, a set of instances is considered configuration write consistent if:
1. the set of instances is specified as a configuration by the configuration management layer;
2. every instance updated will be current at the same time; and
3. every temporal version of the configuration is completely contained in temporal versions of principal paths or is completely contained in temporal versions of alternate paths.

The following set of group update rules based on this definition maintain configuration write consistency:
1. If all instances are the current version of a principal path, apply the updates to the principal paths producing new temporal versions of each object in the group.
2. If all instances are the current version of an alternate path, apply the updates to the alternate paths producing new temporal version of each alternate path in the group.
3. If some subgroup of the instances are the current version of an alternate path and the other instances are non-current versions of their respective paths, for each of the non-current instances create and substitute a new alternate path rooted at that instance and carry out the updates according to rule 2.
4. If some, but not all, of the instances are the current versions of a principal path, for each instance that is the current version of a principal path, create and substitute a new alternate path rooted at that instance and carry out the updates according to rule 3.

LOCKING DURING GROUP UPDATE

Execution of a group update requires that a lock be obtained from the appropriate primary site for each entity in the group. Thus, steps two and three of FIG. 7 must be repeated until all necessary locks have been obtained. Similarly, steps six and seven in FIG. 7, must be repeated until all the acquired locks have been released. When multiple locks are requested by multiple transactions, deadlock may occur. If a lock is currently held by a transaction Ti and transaction Tj requests the lock, transaction Tj enters a transaction_wait_for relationship with transaction Ti. Transaction Ti in turn may be in a transaction_wait_for relationship with another transaction. If a cycle exists in the transaction_wait_ for relationship a deadlock has occurred.

To deal with this problem IDHSS employs a deadlock avoidance protocol. The two requirements for using deadlock avoidance are satisfied by IDHSS.
1. Every request declares its read set prior to executing any reads and the write set is contained in the read set or introduces completely new data items.
2. Each IDHSS object has an associated immutable token. The tokens are totally ordered so that the set of IDHSS objects is totally ordered

PROCESSING A GROUP UPDATE

All IDHSS transactions request locks on IDHSS objects in increasing order of the tokens associated with those objects. When all locks have been granted for a group update, the initiating site compares the status of the entities at the time of the checkout with their current status and processes them according to the four group update rules given above. If new alternate paths must be derived, the local site does so by requesting a new implicit alias number from the primary site for the IDHSS object and adding a new path to the tree. The entire tree of versions are held by the lock. Thus, no new locks need to be obtained in order to derive new alternate paths. When all the required new paths have been derived, the updates are performed on the new set of updatable paths. Once the update has been committed locally, the results of the update are multicast to all the sites in the effected federation. A lock release request is sent to the appropriate primary site for each IDHSS object involved in the update. After all the processing steps of FIG. 7 have been completed, the requesting user can be informed of the outcome of the request.

ROBUST DATA ACCESS

An "optimistic robust distributed storage system" is defined as a system that, even when system components have failed, will successfully and optimistically process transactions, will preserve internal consistency at every site, will preserve mutual consistency among groups of communicating sites, and will preserve configuration write consistency among groups of communicating sites.

IDHSS supports optimistic robustness through:

1. a set of rules and mechanisms to support maximum access to user data, and 2. a set of recovery protocols for maintaining internal consistency, mutual consistency, and configuration write consistency among groups of communicating sites.

In order to maximize user access when sites or communications have failed, IDHSS supports the following "Optimistic Access Rule" for the processing of transactions:

given a running site and an authorized user, an entity may be checked out if a copy of all parts of the entity can be acquired.

Any entity that has been previously checked out may be updated. The requests assign, name, delete, erase, derive, set_permission, grant, or deny may be processed if they affect IDHSS objects that are known to exist. Requests to create new IDHSS objects are always processed. Under the optimistic access rule almost all requests submitted at running sites during the failure of other components of the distributed system are executed. Requests that cannot be processed include: a checkout request for data that is not accessible due to a failure; and an update request on data that cannot be checked out. Requests such as assign, name, delete, erase, derive, set_permission, grant and deny can be performed on an object O only if the site processing the request knows the object O exists. If object O does exist, information about O is contained in the site's system directory.

IDHSS can support robust optimistic access control because under normal processing conditions IDHSS ignores the possibility of update conflicts until they actually occur. If a failure partitions the network, IDHSS may unknowingly process conflicting updates in separate partitions. In some sense the system ignores these conflicts until the failure is repaired and the partitions are brought back together. When the partitions are merged, the conflicting updates occur but can be managed, as they would be in a failure free environment, by implicitly deriving alternate versions. The general philosophy is that the results of conflicting requests will be managed by merging the results of the request or by allowing one result to prevail over another.

If IDHSS is to support the optimistic access rule, the system must continue to process requests under most every possible circumstance. Processing a IDHSS request may require a combination of four types of service:

1. approval of a name by the federation's name server site, 2. locking of a IDHSS object by the primary site associated with that object, 3. generation of a unique implicit alias number by the primary site associated with the affected IDHSS object, and 4. providing another site with a copy of user data stored by the local site.

To continue processing requests when failures occur, the services provided by sites other than the local site must be performed by a replacement site. Service support must be capable of migrating among the sites belonging to a federation. Service responsibilities are migrated from one site to another by the use of pseudo name server sites, pseudo primary sites, and multiple copy sites. A "pseudo name server" site is one site that acts as a temporary replacement for the federation's true name server site. A "pseudo primary" site for a IDHSS object is one site that acts as a temporary replacement for the object's true primary site. If a site holds a copy of a data item, that site is a copy site for the data item. To provide checkout capability during a failure, each data item will have multiple copy sites.

Placing multiple copies of each instance of data on distinct sites is done whether or not the distributed system has suffered any component failures. In contrast, designating and using a pseudo name server site or a pseudo primary site is an action that is taken only when a failure is noted by some site in the system. This implies a need for a mechanism for keeping track of failures noted by active sites. The mechanism utilized by IDHSS is "virtual partitioning".

A VIRTUAL PARTITION PROTOCOL

A virtual partition is a group of sites in one federation that have agreed that they will talk only to each other for the processing of transactions. Sites belong to different virtual partitions for each federation to which the site belongs. If failures did not occur and no new sites ever enrolled in the federation, the virtual partition would consist of all sites belong to the federation. A management protocol allows the list of sites belonging to a virtual partition to be modified. Detection of a possible failure or detection of the correction of a possible failure signals a need to modify the list of sites in the virtual partition. The virtual partition loses sites from the group when a failure occurs and adds sites to the group when a failure is corrected.

Every virtual partition has a unique name, the set of all partition names generated forms an ordered set, and the names are generated in an increasing sequence. In IDHSS, virtual partition names are decomposable into two parts. The first part is a count that reflects the number of times the virtual partition membership has been modified. We refer to this count as the "level number" for the virtual partition. The second part is the name of the site that initiated the virtual partition. When a federation is defined by a client on a site S, the name of the first virtual partition for that federation is 1S and site S is the only member of partition 1S. When a request is processed by the sites in a virtual partition, the results written by that request are tagged with the name of the partition. This tag represents the fact that the sites belonging to the virtual partition named must have been informed of the result.

A virtual partition is an attempt to form mutually exclusive groups of sites that have two-way communication with each other. A list of the sites belonging to a virtual partition may not be correct in that sites which are not reachable may be in the list and sites that are reachable may not be in the list. The site list for a virtual partition may require modification if any site in the virtual partition receives a message from a site not in the virtual partition, or if any site in the virtual partition fails to receive a response from a site belonging to the virtual partition. If a site S believes that the list of sites belonging to the virtual partition is incorrect, the site S must initiate a new virtual partition.

Formation of a new virtual partition is achieved by a two-phase protocol. Appendix 1 presents an algorithm for initiating a new virtual partition. In phase one, the initiator site S first constructs a new virtual partition name by adding two to the current virtual partition's level number or the largest level number proposed in this federation, and appending the site name S. Next, site X sends a message to all known sites in the federation inviting them to join a new virtual partition. The message contains the new proposed virtual partition name and a list of all the sites believed to be members of the federation.

The sites receiving the invitation examine the proposed virtual partition name and the list of sites. Appendix 2 presents an algorithm for processing virtual partition invitations. A receiving site accepts the invitation if the proposed virtual partition name is greater than the name of the partition it currently belongs to or of a partition name it has accepted, and if the list of sites contained in the invitation includes all sites believed to be members of the federation. If the invitation is acceptable, the receiving site sends an acceptance message to the initiating site. An acceptance message contains the name of the site and the virtual partition history of that site. A virtual partition history is a list of the names of all of the virtual partitions a site has been a member of. A receiving site rejects the invitation if the proposed virtual partition name is too small or if any sites that are known to be members of the federation are missing from the list of sites contained in the invitation. If the invitation is rejected and the receiving site has not already accepted a better invitation, the receiving site must initiate of a new virtual partition.

The initiating site associates a timeout interval with each invitation sent. If the time interval elapses without receiving a reply from the site, that site will not be included in the new virtual partition. When each invitation has either timed out or been replied to, the initiating site enters phase two of the protocol and sends a commit message to those sites that replied. The commit message contains the name of the new virtual partition, each unique virtual partition history, and the list of sites that reported that partition history.

Each site that received an invitation sets a timeout on the commit message associated with that invitation. If the commit message does not arrive within the time limit, the receiving site will attempt to initiate a new virtual partition. If the commit message arrives within the time limit, the receiving site enters phase two of the partition protocol.

Figure 8:
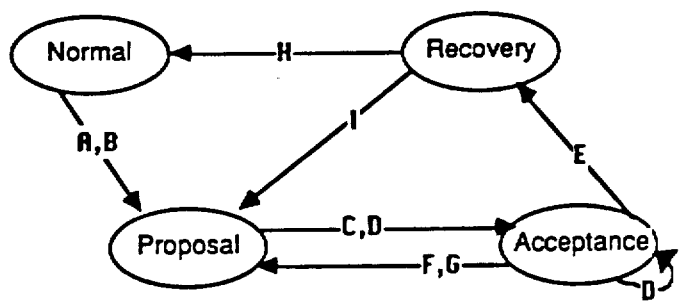
FIG. 8 is a state diagram of illustrating a recovery process.

If a site is running, it must be in one of four states: normal, proposal, acceptance, or recovery. Transitions among these states are controlled by the virtual partition negotiation protocol. FIG. 8 is a state diagram showing the possible transitions and the conditions that cause those transitions. With reference to FIG. 8, the following conditions cause the transitions shown:

A. Receive a message from a site outside of current virtual partition.
B. Fail to receive a replay or response form a remote site within a specified time limit.
C. Accept your local site proposal.
D. Receive a better proposal.
E. Receive the commit message.
F. Fail to receive the commit message within a specified time limit.
G. Receive a proposal with an unacceptable proposed partition name but announces the existence of new sites in the federation.
H. The recovery is completed and the site commits to a new virtual partition.
I. Fail to receive a message from a committed site within a specified time limit.

The negotiation protocol will generally converge and return all sites to the normal state. There are environments in which the protocol will cause all sites to cycle between the proposal and acceptance states or the proposal, acceptance, and recovery states. When the sites eventually enter the recovery state, each site determines what type of recovery is taking place and executes an appropriate consistency protocol that ensures that the local site is mutually consistent with the other sites in the new virtual partition. Once mutual consistency has been achieved, each site officially commits itself to being a member of the new virtual partition. Committing to membership in a virtual partition means that the site remembers the name of the new virtual partition, remembers the list of sites belonging to the new virtual partition, and uses the new virtual partition name as the tag value for the results of each write request.

Two recovery protocols are employed to ensure the mutual consistency of the sites in a new virtual partition. If all of the sites in the new virtual partition reported the same virtual partition history, the virtual partition will perform a divergence recovery. If any site reports a disparate virtual partition history, the virtual partition will perform a merge recovery.

PSEUDO NAME SERVER SITES

To support optimistic access, INDHSS uses pseudo name server sites as a means of providing name server functionality in each virtual partition. A pseudo name server site is a substitute for the true federation name server site. When a federation is defined, the site at which the define request was submitted becomes the true name server site for the federation. When processing transactions, communication is limited to those sites in the current virtual partition. If the true name server site is not in the current virtual partition, a pseudo name server site must be selected. The selection process requires the existence of a total ordering on the set of sites. At least two natural total orderings exist: order the sites alphabetically by site name; or order the sites by the network address associated with each site. If the true name server site is not in the current virtual partition, the smallest site, according to the ordering on sites, will become the pseudo name server for this virtual partition. This protocol ensures that each virtual partition contains exactly one site acting as the name server for the partition.

Each name server site maintains a flat name space within its respective virtual partition by preventing sites within that virtual partition from creating duplicate object base names. Duplicate object base names are avoided by appending a suffix to each duplicate name, the suffix including first the name of the user that created the object base name, and second (if necessary) the name of the site on which the creating request was submitted.

When an object base name is created, the name of the creating user and the name of the site on which the creating request was submitted are saved with the user-defined portion of the name. When requests are processed by the storage server, each object base name specified in the request is looked up in the system directory. If multiple directory entries are found for the user-defined portion of the name, the user receives a reply that the name is ambiguous. The user may then query the storage system using the name_match request to obtain a list of fully modified names with matching prefixes. The user may repeat the original command using a modified name which is unique. If the user-defined portion of a name is unique over the set of known object base names, the normal reference using only the user-defined portion of the object base name is sufficient.

PSEUDO PRIMARY SITES

To support optimistic access, IDHSS uses pseudo primary sites as a means of providing primary site functionality for each accessible object in each virtual partition. Primary sites are responsible for granting locks on objects, thus guaranteeing sequenced updates to those objects. The true primary site is the site on which the IDHSS object was created. When a write request is processed by the storage system, each IDHSS object affected by the request must be locked. Request processing is always limited to those sites in the current virtual partition. If one or more of the required primary sites are not in the current virtual partition, each of the missing primary sites must be replaced by a pseudo primary site. A pseudo primary site substitutes for the true primary site by granting locks on behalf of the true primary site. When a site other than the true primary site receives a request for a lock, that site must check to see that it has been elected as a pseudo primary site for the data item being locked. If the site is not the pseudo primary site, an appropriate reply is returned to the site that requested the lock. The requesting site may seek to become the pseudo primary site.

The process of selecting a pseudo primary site is based on a two phase selection protocol. If a client, local to a site S, requests a write operation on a data item X, site S must obtain a lock from the primary site for X before processing the request. If the true primary site for X is not in the current virtual partition of site S, site S must determine whether or not a pseudo primary site for X exists in the current virtual partition. A pseudo primary site for X exists if the local site believes that a pseudo primary site has been elected, no merge recoveries have been performed since the election completed, and the elected pseudo primary site is in the current virtual partition. If neither the true primary nor a pseudo primary site for X is in the current virtual partition, site S will initiate a two phase election of a pseudo primary site. Appendix 3 presents an algorithm for nominating a pseudo primary site. In phase one, site S will nominate itself as the pseudo primary site and all sites in the current partition will cast a vote. If elected, in phase two site S will send a commit message to all sites in the current partition, receive an acknowledgment from each site in the current partition, and then consider itself to be an elected pseudo primary site. This two phase protocol is similar to the asynchronous-timeout-based negotiation protocol for forming a virtual partition.

Appendix 4 presents an algorithm used by the voting sites. When a site receives an election proposal, that site must send a reply accepting or rejecting the nomination. A site will reply with a rejection only if it has previously received a nomination for a site that is larger than the newly proposed site according to the total order on sites or it has already committed, during the current virtual partition, to a different pseudo primary site. After accepting one nomination, a site not yet committed to that nomination may accept a better nomination. Eventually the largest site that desires to be the pseudo primary site for data item X will be elected. If a failure or timeout occurs during the election, a new virtual partition must be formed. Recovery and pseudo primary site election are interwoven in that recovery will terminate pseudo primary site elections. When the recovery is completed, the request that required the lock must re-evaluate the accessibility of a primary site in the new current virtual partition. If a primary site is not a member of the new virtual partition, the election process will be initiated again.

Once a pseudo primary site is elected, that site is used as the primary site until the pseudo primary site is no longer in the current virtual partition or a merge recovery is performed. When a merge recovery is performed, all pseudo primary sites must relinquish their position. Elected pseudo primary sites continue to function in any new virtual partition formed by a divergence recovery. In a divergence recovery, we are ensured that the true primary site could not have rejoined our virtual partition. If all sites in the larger partition agreed on site S as the pseudo primary site for X, all sites in the new reduced partition hold the same agreement; thus, we may continue to use the elected pseudo primary site if that site remains in our virtual partition. When a merge recovery is performed, the sites in each of the merging partitions may have different pseudo primary sites for X; therefore, pseudo primary sites must relinquish their status following a merge recovery.

REPLICATION OF DATA

To support optimistic access in IDHSS, multiple copies of each item of user data are maintained. In most systems, data replication enhances only read access. In IDHSS, data replication enhances both read access and write access because read access is the only necessary condition for write access.

The create request and the update request cause new data to be stored in the database. In each of these commands the user may optionally specify a replication factor for the new data item. A replication factor of one may be specified. In this case, the system will make only one copy of the data item even though this greatly increases the probability that the data could become inaccessible for reading and consequently inaccessible for updating. If no replication factor is specified, a default replication factor is used. Each federation is assigned a default replication factor when the federation is defined; either the user defining the federation specifies a factor to be used as the federation wide default or the IDHSS system wide default factor (currently two) is used.

When a create request or an update request is processed, the first copy created is stored on the site at which the request was issued and processed. When the results of the request are multicast to all sites in the current virtual partition, the multicast message also contains a list of the sites that should store a redundant copy of the data. When such a multicast message is received and processed, the site that issued the message is recorded as holding a copy of the data item; all other sites listed are recorded as designated but not yet confirmed copy sites. If a site finds its name among the list of designated copy sites, that site must attempt to obtain a copy of the data from some site that is known to have a copy. Once a site has obtained, a redundant copy of a data item, that site will multicast this fact to all sites in the current partition, thus altering its status from a "designated" copy site to a "confirmed" copy site.

An algorithm for constructing the list of N designated copy sites is presented in detail in Appendix 5. The main factors to be considered in selecting placement sites are which sites are designated as fileserver sites for the federation, which sites are in the current virtual partition, which sites store previous versions of the data item, which users are permitted access to the data, and how much storage space has already been contributed by each site. If at least (N−1) filserver sites are in the current virtual partition, select (N−1) of the fileserver sites as designated copy sites giving preference to those fileserver sites that stored the previous temporal version of this data item or have contributed the least storage space to storing IDHSS objects. If the current partition does hot contain sufficient fileserver sites, select other sites giving preference to those sites that stored the previous temporal version of this data item or have contributed the least storage space to storing IDHSS objects.

The selection algorithm may be forced to select sites that are not members of the current virtual partition. When a merge recovery is performed, these sites will learn of their selection as designated copy sites. After the recovery is completed, these designated sites request a data copy from a site that is known to store a copy. Once a copy is obtained, the site will multicast this fact to all sites in the current virtual partition, thus changing its status from a designated copy site to a confirmed copy site.

In the case of a create request or an update request that adds a new path, the selection algorithm gives preference to fileserver sites and those sites that have contributed the least amount of storage space. For an update to an existing path, preference is given to sites that store the previous temporal versions of that data item. These sites are preferred because we can make use of the ancestral relationship of data instances to reduce the storage space required to store multiple versions of an object.

If a site stores two temporal versions of a data item, the most recent version will be stored as a full copy and the older version can be stored as a backward difference based on the newer version. A difference is conceptually an errata list specifying the differences between an old version and a new version of a data item. A backward difference is a list of changes that must be applied to the newer version to produce the older version. If a site acquires a full copy of a new data instance I and the site has a full copy of a previous temporal version O of this same instance, the old full copy O is replaced with a backward difference with respect to the new copy I. The instances O and I participate in a differenced_from relationship for the local site; instance O is differenced_from instance I. Backward differences are used rather than forward differences so that we may store full copies of all current instances. This saves time when processing checkouts because most checkout requests are for current instances which are always stored as full copies.

If a user requests a checkout of an older version and that version is stored as a difference on site S, the storage server on site S must reconstruct the desired version. The storage system directory contains information on the differenced_from relationship for the local site so we know how to reconstruct older versions. Reconstruction of an older version is accomplished by following the differenced_from relationship forward to locate a full copy and then backwards, applying the changes stored in each difference in the order specified by the reverse of the differenced_from relationship.

Figure 9:
FIG. 9 is a graphical view of three consecutive temporal versions from one path of a data object.

FIG. 9 shows three consecutive temporal versions, instances 1, 2 and 3, from one path of a IDHSS object. A possible placement of those versions on three sites S1, S2, and S3 assuming a replication factor of two is as follows:

Instance 1: sites $S_1$ and $S_2$
Instance 2: sites $S_1$ and $S_3$
Instance 3: sites $S_2$ and $S_3$.

An update creates a new path instantiated by instance 1 and places a copy of instance 1 on sites S1 and S2. A checkout and update are performed on instance 1 to create instance 2 and copies are placed on sites S1 and S3. Another checkout and update are performed on instance 2 to create instance 3 and copies are placed on sites S2 and S3. The local representation of each instance and the differenced_from relationship are recorded in the system directory at each site. If the storage server at site S1 is asked to provide a copy of instance 1, the directory at S1 states that instance 1 is stored as a difference and that it was differenced from instance 2. Since instance 2 is stored as a full copy at S1, the storage server applies the changes for instance 1 to the full copy of instance 2 producing a full copy of instance 1. The process is summarized in tabular form below:

| Create Version 1: | | |
|---|---|---|
| version | format | differenced from |
| Site $S_1$ | 1 full | null |
| Site $S_2$ | 1 full | null |
| Site $S_3$ | 1 none | null |
| Update Produces Version 2: | | |
| version | format | differenced from |
| Site $S_1$ | 1 diff | 2 |
|  | 2 full | null |
| Site $S_2$ | 1 full | null |
|  | 2 none | null |
| Site $S_3$ | 1 none | null |
|  | 2 full | null |
| Update Produces Version 3 | | |
| version | format | differenced from |
| Site $S_1$ | 1 diff | 2 |
|  | 2 full | null |
|  | 3 none | null |
| Site $S_2$ | 1 diff | 3 |
|  | 2 none | null |
|  | 3 full | null |

-continued

| Site S₃ | 1 none | null |
|---|---|---|
| | 2 diff | 3 |
| | 3 full | null |

MAINTAINING CONSISTENCY

A requirement for achieving robustness is a set of recovery protocols augmenting normal transaction processing to maintain internal consistency, mutual consistency, and configuration write consistency among groups of communicating sites. A virtual partition represents a group of communicating sites, thus we must preserve consistency within each virtual partition. In a failure free environment, normal request processing is sufficient for maintaining internal consistency, mutual consistency, and configuration write consistency. A properly functioning virtual partition is a failure free environment.

When membership in one virtual partition must be abandoned for membership in another virtual partition, the assumption of a failure free environment has been violated. The normal request processing protocol is insufficient for maintaining consistency when transitioning from one virtual partition to another. Virtual partitions reconfigure when sites cannot be reached or when sites considered to be unreachable begin communicating.

One virtual partition splits into two or more virtual partitions when a site crashes or a communication failure occurs. First the failure must be detected. Next, a new virtual partition is formed, and finally any inconsistencies among the sites in the new virtual partition must be corrected. A site A detects a failure if any site B in the current virtual partition fails to reply to a service request within some time limit, or fails to acknowledge a multicast message within some time limit. If a site fails to reply to a service request, we must reconfigure the virtual partition so that a pseudo service site can be selected and the client's request can be processed. If a site fails to acknowledge the processing of a multicast message, a mutual inconsistency may exist between the site that sent the multicast message and the receiving site. Any site that believes it has detected a failure must initiate a new virtual partition.

A failed site may cause a current inconsistency among the surviving sites. The source of this inconsistency is seen by studying the processing of requests on a site. A site processes requests by obtaining locks from primary sites, performing local processing of the request, and multicasting the results of the request to all other sites in the virtual partition. Few network facilities provide true multicast communications that are reliable. True multicast communication is the sending of a single message to a selected set of sites by placing the message on the network exactly once. Reliable multicast would ensure that either all of the selected sites received the message or none of the selected sites received the message. In general, multicast communication is simulated by point-to-point communication between the sender and each receiver of the message. This means that the single message must be sent repeatedly, once to each destination site. If a site was in the process of multicasting a message by a sequence of point-to-point messages and the site crashes, some of the destination sites will receive the message and some will not receive the message. This results in an inconsistency among the surviving sites.

Clearly, part of the solution to this problem is to require the sites that did receive the failed site's last message to propagate that message to those sites that did not receive the last message. Such a propagation strategy is implemented by placing restrictions on the sending of multicast messages, by logging each multicast message, and by requiring some synchronization during the processing of a request. Sending of multicast messages is restricted such that each site may send at most one multicast message at any time. Requests that have completed their local processing must queue for the multicasting of their results. Each site will log the most recent multicast message received from every site including itself.

Each multicast message contains a sequence number. Multicast message sequence numbers are generated in increasing order by each site for the multicast messages they send. The multicast message sequence number will be logged by each receiving site as part of the multicast message. These sequence numbers are part of the information which will be passed during the two phase negotiation of a new virtual partition. Table II shows the information that must be exchanged by the virtual partition initiator and the members of the virtual partition during the two-phase virtual partition negotiation.

TABLE II

1. The Virtual Partition Initiator sends an Invitation containing:
   Proposed Virtual Partition Name
   List of all sites known to be members of the federation
2. A Site receives the invitation, and sends a reply containing:
   Local site name
   The virtual partition membership history for the local site
   For each site in the current virtual partition, one pair containing:
   site name
   sequence number of the last multicast message logged for this site
3. The Virtual Partition Initiator sends a Commit message containing:
   Name of the new virtual partition
   For each unique virtual partition history reported, a list containing:
   The virtual partition history
   A list of the sites that reported this history
   For each site reported by a site with this history, one triple containing:
   site name
   multicast message sequence number
   name of a holding site that reported this sequence number During virtual partition negotiations, each site receiving an invitation will include, in the acceptance message, multicast sequence number information for each site in its current virtual partition. The information will be a list of pairs: <site name, sequence number contained in the last multicast message received from this site>. The virtual partition initiator will process the pairs. If more than one sequence number is reported for a site S by two sites in the same virtual partition, an inconsistency exists. Because a site can be in the process of sending at most one multicast message at any time, and because remote sites must acknowledge processing each multicast message, there may be at most two distinct sequence numbers reported by sites that were members of the same virtual partition. That is, a site may miss at most one multicast message before a virtual partition negotiation and recovery is executed. For each site reported in a pair, the initiator will add an ordered triple to the commit message of the new virtual partition. Each ordered triple contains: <site name, largest sequence number reported, name of site reporting this sequence number>. The virtual partition initiator will multicast the commit message to those sites that agreed to join the new partition. When the commit message is received, each site will compare the sequence number in each triple with the appropriate message in the multicast message log. If the sequence number in the log is smaller than the sequence number in specified in the commit message, a copy of the missed multicast message must be acquired from the site specified in the triple. When the multicast message is received, it is logged in the multicast message log and processed to completion. This process is performed for each triple in the multicast message. If multiple multicast messages were missed and had to be acquired, they may be processed in any order because they represent the results of non-conflicting requests.

When all multicast sequence numbers have been compared and all missing messages obtained and processed, the site commits to membership in the new virtual partition. Thus, divergence recovery is a three-phase protocol: the two-phase virtual partition negotiation and the propagation of missed multicast messages. Appendix 6 presents an algorithm used by the virtual partition initiator to process replies of all joining sites. Appendix 7 presents an algorithm for message propagation as performed by all members of the newly formed partition. This message propagation protocol is effective in that all sites remaining in a virtual partition formed by a divergence recovery will eventually process the same set of requests.

PREEMPTION OF REQUESTS

When a divergence recovery is completed, the sites remaining in the newly formed partition will process new requests in the failure free environment of the new virtual partition. Normal request processing in a failure free environment is sufficient to maintain internal, mutual, and configuration write consistency. These results assume that the system has been failure free from time zero when the storage system was empty and zero requests had been processed. In particular, it assumes that no requests are being processed when the failure free environment begins. This assumption does not hold for the environment at time zero of the new virtual partition. Requests that are being executed at the time recovery processing begins are suspended. These suspended requests will either be resumed or backed out and restarted. Divergence recovery does not require that all requests in progress at the initiation of recovery be backed out and restarted. IDHSS selectively performs backout and restart on requests that may cause a loss of mutual consistency in the new partition and requests that may cause hung requests in the new partition. A hung request is one that is blocked by a request that is no longer active in the current virtual partition.

AVOIDING HUNG REQUESTS

When a divergence recovery is completed, the remaining sites should be able to process almost all requests. The only restriction is that the sites must know of the existence of the data and a copy of the data must reside on at least one site in the new partition. The ability to continue processing after a recovery may be hindered by side effects of requests that were being processed by sites excluded from the new virtual partition. In particular, requests that are partially processed by an excluded site may have set locks at primary sites. The primary sites may be members of the new virtual partition. Because the requesting site has been excluded from the new partition, these resources will not be released by the requesting site. If a new request requires a lock that is held by a partially processed request on an excluded site, the new request would be hung.

A request R is hung if R is blocked by a sequence of requests and one of the requests in the sequence is no longer active in the current virtual path. To avoid hung requests, every site in the new virtual partition must release locks that are held by requests being executed on sites which are now excluded from the new partition. As part of divergence recovery, each primary site must scan the local lock table discarding all entries requested by sites that are not members of the new partition. If a request R has its locks released for this reason, from the perspective of the newly formed partition, R has been preempted. A request R is "preempted" if all locks currently held by R are released, R is backed out, and R is restarted. The locks granted to request R are released by one partition and the backout and restart of request R is performed in another partition that has as a member the site which initiated R.

Pending name reservations at a name server site are managed in the same manner. If the site that requested the pre-reservation of a name is not a member of a new partition formed by a divergence recovery, the name server site will release the name reservation. The pre-reserved name may be reused by any site remaining in the partition following the recovery.

PREPARING FOR FUTURE MERGE RECOVERIES

A failed site may cause future inconsistencies among the sites in a virtual partition. If the failed site was detected by one or more sites sending a multicast message of their latest results, these results would have an associated virtual partition tag value that was the name of the pre-failure virtual partition. The purpose of the tag value is to signify that all sites belonging to that virtual partition have knowledge of those results. This constraint may be violated when a site fails. In particular, the failed site will not have knowledge of the results specified in a multicast message that caused the discovery of the site failure. These erroneous tag values will cause a future inconsistency, because there is no way to discover that the failed site does not have knowledge of these particular results.

The solution to this problem is to retag the results specified in each of the logged multicast messages, using a future virtual partition name as the tag value. This has the effect of pushing the results forward in partitioned time. This establishes the state required for merge recovery to locate and process all information that may be unknown to a site which is attempting to join a virtual partition.

Each site participating in the divergence recovery must scan the multicast message log and retag the results specified in each multicast message. The results specified by a multicast message should be retagged only once, thus each multicast log entry has an associated status regarding retagging. When a multicast message is written to the log, its status is retaggable. If the results specified by a multicast message are retagged due to a divergence recovery, the status is altered to not retaggable.

The virtual partition name to be used for retagging is formed from the name of the new virtual partition. If the new virtual partition name consists of level number N and site name S, the retag partition name consists of level number (N-1) and site name S. A retag partition name exists in the gap between the old partition name and the new partition name. All sites that complete the divergence recovery must record the new virtual partition name as part of their partition history; membership in the retag partition is implied by membership in the new virtual partition. Appendix 8 provides an algorithm for committing a divergence recovery. The protocol for divergence recovery as presented is sufficient to maintain mutual consistency among the sites in the newly formed virtual partition.

MERGE RECOVERY

Two or more virtual partitions merge into one virtual partition when a site recovers from a crash, or a communication failure is corrected, or a new site enrolls in a federation. First, the correction of the failure or the enrollment must be detected. Next, a new virtual partition is formed, and finally any inconsistencies and conflicts among the sites in the new virtual partition must be corrected.

If a site wishes to enroll in a federation that is currently unknown at that site, the site is easily enrolled by a merge recovery. The merge recovery brings the new site into the federation, propagates all of the directory information to the new site, and merges the site into a virtual partition for that federation. An enrolling site E causes a merge recovery to take place by acting like a crashed site that was in a single site partition name OE.

If the merge recovery is necessitated by the restart of a crashed site, the failed site must perform a local recovery to stabilize itself prior to merging with other sites in the federation.

CRASH SITE RECOVERY

When a crashed site is restarted, that site must bring the local IDHSS system directory to a stable state prior to communicating with other sites. The purpose of the stabilization process is three fold: first, we must test for media failure due to the site crash; second, we must ensure that each request was executed atomically; third, we must ensure that results committed by this site are already known by other sites or will be propagated to all other sites by future merge recoveries. One side effect of a site crash is that all locks and name reservations recorded at that site will be lost. As part of the stabilization process, the recovering site will form a new virtual partition containing only the local site. Throughout the stabilization process, the recovering site will discard all messages received over the network and will not initiate any sessions with local clients. Once the site has stabilized as a single site partition, a "finder" will attempt to communicate with other known sites in the federation to force a merge recovery.

MEDIA FAILURE IN IDHSS

Testing for media failure must be the first step in crash site recovery. A stable storage device may experience failure in varying degrees. If any portion of the directory is deemed to be unreadable, the storage system has experienced a media failure. A severe failure would require that the storage device itself be replaced. In such a case the storage system cannot make an automatic recovery becuase all information has been removed. Recovery may be achieved by the intervention of a local client executing an enroll request for each federation in which the site was formerly a member. If the failure renders only portions of the storage device unusuable, the storage system may detect this by attempting to scan the entire IDHSS system directory. System restart always begins with a full scan of the local system directory.

The storage system can recover from a partial media failure by building a new system directory based on re-enrollment in each federation in which the site was formerly a member. To carry out this recovery automatically, the storage server must be able to read all of the directory records describing federations and the site and users belonging to those federations. Without this information, the storage server will not know which federations to re-enroll in, which sites to contact, and which users to enroll. The readability of this information is not guaranteed but the probability that it can be read is greatly increased by duplicating the federation, site, and user information in the local system directory. With this approach we must designate one copy to be the primary copy for use during non-failure mode processing. Maintenance of the duplicate copies is not a problem, as the extra copies need to be modified only when a user or site secedes from a federation.

If the storage system determines that a partial media failure has occurred, the system will read as many federation, site, and user records as can be located in the system directory. The storage system will then build a new system directory by re-enrolling the local site in each federation found in the old directory. The users found in the old directory will be re-enrolled in their respective federations.

ATOMIC EXECUTION OF REQUESTS

To ensure atomicity in the event of a site crash the storage system will maintain a write ahead undo/redo log associated with each request currently being processed by the local site. The log for a request will contain the original request message and a report of the new and modified values the request intends to write to the system directory. Log information must be written to stable storage before any of the modifications it reports are written to stable storage.

When all locks, name approvals, and implicit alias numbers have been obtained, the local processing of a request consists of nine steps.
1. Calculate all the new and modified values that will be written to the IDHSS system directory.
2. Write the original request message and all intended modifications to an undo/redo log for this request.
3. Commit the undo/redo log information to stable storage by a forced write.
4. Carry out the modifications on the IDHSS system directory.
5. Queue for the ability to multicast the results of this request.
6. When the multicast service has been seized, then ensure that the system directory modifications have been committed to stable storage by a forced write.
7. Initiate a multicast of the results of this request.
8. Notify the requesting client of the outcome of the request.

9. Free the undo/redo log space associated with this request for reuse by new requests.

When recovering from a site crash, the storage system must undo and redo requests that have not been committed and multicast to other sites. If the processing of a request has not reached the multicasting step (i.e. step 7), the results of the request should be undone and the request should be re-executed. Once a request has reached the multicast stage, its results are known outside of the local site and must not be undone. If the processing of a request has been committed locally, the results have been multicast to the other sites in the virtual partition, and the requester has received notification of the outcome of the request, the undo/redo log information associated with this request may be deleted from the log. This means that only a minimal amount of stable storage space must be dedicated to the undo/redo log.

Undo is accomplished by scanning the current undo/redo log entries. If a request must be undone, the undo information is used to remove each reported modification from the local system directory. Each request whose results are undone is marked for redos. Requests marked for redo will be processed by the system at a later time.

Once all of the necessary undo operations have been performed, the storage server will perform a consistency test on the local directory. The consistency test is used in an attempt to detect write failures that occurred at the time of the site crash but did not render any records unreadable. The test requires a logical scan of the IDHSS system directory. Precisely how to perform the scan and what to check for during the scan are determined by the logical organization and the physical organization used to implement the system directory. By physical organization is meant any linkage between directory records that represents solely physical organization concerns. For example, records may be organized into buckets and the buckets may be chained together. The bucket chains determine a physical organization. By logical organization is meant the logical links between records in the directory. For example, each directory record containing information about a IDHSS object must reference another record in the directory specifying that record to contain the information on the principal path for this object. If the record referenced does not contain information about a path, an inconsistency has occurred. Similarly, each record describing a path in a IDHSS object will contain a reference to a record that describes the current instance in that path.

The consistency test begins by scanning all physical linkage in the system directory. If the physical linkage is not traversable, the storage server will claim that an undetected write failure has occurred. If the physical linkage is traversable, the logical linkage is traversed and the record types are verified. If a logical link is broken or a record type invalid, the storage server will claim that an undetected write failure has occurred. The logical linkage is on a federation-by-federation basis. If the physical linkage is on a federation-by-federation basis, recovery from an undetected write failure can be achieved by performing a media failure recovery for an individual federation. The storage server caches a list of local users who are members of the ailing federation, free all system directory entries for the federation, and re-enroll the local site and the local users in the ailing federation. If the physical linkage is not on a federation by federation basis, inability to traverse the physical linkage will result in a full media failure recovery.

FUTURE INCONSISTENCIES AND ESTABLISHING COMMUNICATIONS

Before attempting to establish communications with other sites, the recovering site must ensure that the results recorded in the multicast message log entries are known by the other sites in the federation or will be propagated to the other sites by future merge recoveries. This is accomplished by retagging the results of those requests in the multicast message log with a post-failure virtual partition name. A retag partition name must be constructed for this purpose. The recovering site must know the name of the virtual partition it was a member of at the time of the crash. If this previous partition contained only the crashed site, no new virtual partition should be formed. The retag partition name is formed by subtracting one from the level number of the previous partition level number. If the previous partition was not a singleton, the site should construct a new virtual partition name based on the previous partition name. The retag partition name is formed by subtracting one from the level number of the new partition level number. The retag partition name should be used to retag the results specified by each multicast log entry that has not been retagged previously.

Once all necessary undo operations have been performed, all necessary multicast results have been retagged, and the site has committed to a singleton virtual partition, a finder process is started. The finder will cycle through the federations known to the local site and attempt to communicate with sites belonging to those federations. For each federation the finder will send a "liveness" message to one of the member sites, set a timeout for receiving a virtual partition invitation for that federation, and wait. If the invitation arrives within the specified time limit, a merge recovery will be executed. If the time limit expires before an invitation is received, the finder will attempt to communicate with a different site belonging to the federation. If all sites in a federation fail to respond, the recovering site will begin processing as a singleton virtual partition. The first step in processing is to redo all those requests that were marked for redo during the undo phase of crash recovery. Once those requests have been redone, the system will become available for new requests. The finder will periodically send a liveness message to the non-communicative sites in the federation. Appendix 9 presents a complete algorithm for crash site recovery.

DETECTION OF FAILURE CORRECTION

Two or more virtual partitions may merge only after the recovery of a crashed site or the correction of a communication failure has been discovered by some site. The sending and receiving of liveness messages will be the general mechanism used for detecting the correction of such failures. Continually sending liveness messages among all sites would cause a proliferation of messages on the network. IDHSS sends a liveness message only to those sites that believed to be unable to communicate with. The service request messages and the multicast messages are really a form of liveness message sent exclusively to those sites we believe we can communicate with. The receiving of a liveness message serves as a notification that a failure situation has been corrected. If a site receives a liveness message from another site, the receiving site must attempt to initiate a new virtual partition.

Liveness messages are sent and received by a finder process of the storage system. The purpose of the finder is to communicate with sites not in the current virtual partition of a federation. Appendix 10 presents the algorithm used by the finder to detect failure correction. The finder executes periodically. If a federation is in normal processing mode, the finder will try to communicate with sites outside of the current partition. When a federation is performing partition negotiation and recovery, the finder is dormant for that federation. At each execution, the finder cycles through the federations known by the local site, and for each federation the finder determines the set of excluded sites. The excluded sites are those sites that are members of the federation are are not members of the current virtual partition for that federation. A liveness message will be sent to one of the excluded sites. Upon the next execution of the finder, if the set of excluded sites for a particular federation is the same, the finder determines the next site in some ordering of the set and selects it as the destination for a liveness message. It is sufficient to send only one liveness message per federation per execution of the finder because if a merge recovery is initiated, the invitation to join a new virtual partition is always sent to all known sites. Thus, all the sites that are able to merge will be located by using only one liveness message.

MERGING VIRTUAL PARTITIONS

When two or more virtual partitions merge, each virtual partition may have processed requests that the other partitions have not processed. The requests processed by disparate virtual partitions will be classified as conflicting requests or missing requests. Two requests R1 and R2 "conflict" if they are executed in separate virtual partitions and the intersection of the set of objects and paths altered by R1 with the set of objects and paths altered by R2 is non-empty. For example, two update requests conflict if they update the same instance of user data; two assign requests conflict if they assign the principal path of one IDHSS object to be different paths in that object. All non-conflicting requests are missing requests.

The goal of merge recovery is to achieve mutual consistency among the merging sites. This requires the resolution of conflicts presented by conflicting requests and the propagation of the results of all missing requests. To accomplish this, information from the system directory must be exchanged between each pair of unique virtual partitions. This means that there must be one system directory that represents the view held by all sites within a single virtual partition. The partition initiator selects one site from each of the merging virtual partitions to be the representative system directory for that partition. The list of representative sites will be included in the commit message sent by the partition initiator. Table III shows the contents of a virtual partition commit message sent by the virtual partition initiator.

TABLE III

Name of the new virtual partition
For each unique virtual partition history reported,
a list containing:
The virtual partition history
A list of the sites that reported this

TABLE III-continued history
The representative site for this partition history
For each site reported by a site with this history, one triple containing:
site name
multicast message sequence number
name of a holding site that reported this sequence number After the two phase negotiation of a new virtual partition, the third phase of merge recovery will exchange information among the merging sites. Each representative site provides information that represents a mutually consistent view held by all of the sites in the representative's partition. each of the merging virtual partitions can attain mutual consistency with respect to requests that have been multicast by performing the third phase of a divergence recovery among the sites within the partition.

Consistency with respect to those requests that have been multicast is not sufficient. The divergence recovery brings each partition to mutual consistency on the level of multicast messages. Each site may have partially processed requests which the other sites known nothing about. This presents a problem for a merge recovery. In a merge recovery, the information provided by a representative site is in the form of copies of records from the representative's system directory. This information is not at the same level of abstraction as multicast messages. All of the merging sites must process the exchanged information at this lowest level of abstraction. To process this information correctly, each site must be internally consistent. That is, no system directory may contain the partial results of requests that have not been multicast yet. During normal request processing, we used mechanisms to achieve the atomic execution of one request with respect to all other requests. A merge recovery is not a request; therefore it circumvents these atomicity mechanisms by looking directly at the suspended state of a system directory. This suspended state must be an internally consistent state. Internal consistency can be achieved by undoing all suspended requests that have not been multicast. Each undone request is marked for redo.

A merge recovery may force a set of requests to be undone and redone at a later time. These requests may have obtained locks or name reservations prior to the time merge recovery was initiated. These locks must be released by the merge recovery process; otherwise the request will become hung when it is redone. To avoid hung requests, every site participating in the merge recovery must release, for the federation undergoing recovery, all locally held locks and name reservations.

Once each merging virtual partition has achieved mutual consistency and each merging site has achieved internal consistency, the representative sites will scan their local system directory to locate all information that must be exchanged among the merging sites. Every site will send a message to each virtual partition representative requesting the information being provided by each virtual partition. This information is a change list, a list of all the changes that are known in a source partition and are unknown in one or more of the merging partitions. Once all change list information has been processed, each site will commit to the new virtual partition. Once committed to the new partition, the requests marked for redo in the undo/redo log are reinitiated, and new requests are accepted and processed. Appendix 11 presents an algorithm for processing a partition commit message.

CONFLICT DETECTION AND RESOLUTION

To achieve mutual consistency among a set of merging partitions, the system must detect, propagate, and incorporate missing results and must detect, resolve, and incorporate conflicting results. We will now discuss in detail the algorithm employed by merge recovery to achieve a mutually consistent view of the data stored by the system.

MERGING PARTITION HISTORIES

In a merge recovery, the representative site for each partition must construct a list of information that will be useful in achieving mutual consistency among the merged sites. The representative site cannot provide a list of all operations executed within the partition represented because the storage system does not maintain an audit trail of system operation. However, an audit trail of system operation is not required and may even be undesirable. When multiple partitions are merging, it is not essential to have knowledge of every operation executed in a virtual partition. What is essential is knowledge of which items have changed value one or more times within a partition, and what the current value of each such item is. Consider the following example. In one partition a client performs an assign operation on an object O. The assign request alters the name mapping of object O to path p1. A short time later in that same partition, object O is assigned to path p2. When a merge is performed, knowledge that object O was assigned to p1 is of little or no use. The important information is that the mapping of object O to its principal path was altered and O currently maps to p2. Using the knowledge that O was assigned to p1 and then p2 would require that each merging site process both of these actions, even though the results of the first are no longer visible. Further, the actions must be performed in order so that all merging sites conclude that object O currently maps to path p2. Therefore, a representative site need only determine which items have changed value unbeknown to other partitions, and what the newest value is.

Determining the current value of an item is simple. The current value is stored in the system directory of the representative site and is consistent with the other sites in the represented partition due to the execution of a divergence recovery. Determining which items have changed value unbeknown to the other partitions requires the maintenance of additional information. A tag is associated with each changeable item and the tag value is the name of a virtual partition. When an executing request changes the value of an item, the value of the partition tag associated with that item will also be changed to the name of the current virtual partition. This tag value will be used by the storage system to determine which items have changed without the knowledge of one of the merging partitions.

Figure 10:
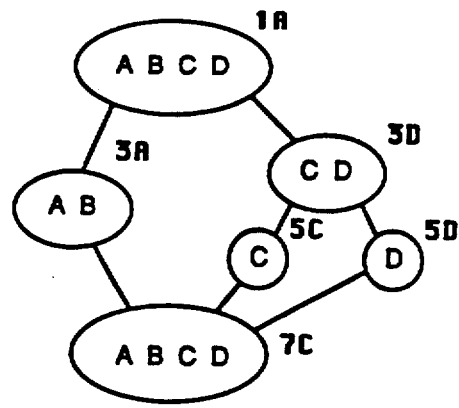
FIG. 10 is a graphical view of partitioning behavior of four sites.

FIG. 10 shows a federation of four sites A, B, C, and D, the partitioning behavior of those sites, and the virtual partition history (VPH) of the three virtual partitions 3A, 5C, and 5D. We wish to investigate a merger of the three partitions. By examining the virtual partition histories, we observe that all of the partitions claim membership in virtual partition 1A. From this we conclude that every item that has not been changed since partition 1A has a value which is known by all of the merging sites. Sites A and B claim membership in virtual partitions 2A and 3A sites C and D do not claim membership in partitions 2A and 3A. From this we conclude that every item that was changed by the site in partitions 2A and 3A has a value which is unknown by sites C and D. Similarly, every item that was changed by the sites in partitions 2D and 3D has a value which is unknown by sites A and B. Site C is the only site that claims membership in partitions 4C and 5C. Thus, each value changed by the site C during the existence of partitions 4C and 5C has a value that is unknown by sites A, B, and D. Similarly, each item changed by site D during the existence of partitions 4D and 5D has a value that is unknown by sites A, B, and C.

For the merge recovery which forms partition 7C, we select site B as the representative for partition 3A, site C as the representative for partition 5C, and site D as the representative for partition 5D. Site B will provide information on all items having an associated partition tag value of 2A or 3A. Site C will provide information on all items having an associated partition tag value of 4C or 5C. Site D will provide information on all items having an associated partition tag value of 2D, 3D, 4D, or 5D. Even though the sites in partition 5C and the sites in partition 5D were members of 2D and 3D, the changes made during partitions 2D and 3D must be included in the merge information because these changes are not known by the sites in partition 33A and may conflict with changes performed during partitions 2A and 3A. Note that the changes performed during partitions 4C, 5C, 4D, and 5D cannot conflict with the changes performed during partitions 2D and 3D because these changes were performed in full knowledge of the changes performed during partitions 2D and 3D. Thus for the example of FIG. 10:

Federation Sites={A, B, C, D}
Partition 3A={A, B}
Partition 5C={C}
Partition 5D={D}
VPH(3A)={1A, 2A, 3A}
VPH(5C)={1A, 2D, 3D, 4C, 5C}
VPH(5D)={1A, 2D, 3D, 4D, 5D}
Representative(3A)=B
Representative(5C)=C
Representative(5D)=D
VPH(7C)={1A, 2A, 2D, 3A, 3D, 4C, 4D, 5C, 5D}.

Appendix 12 shows an algorithm by which a partition representative calculates the set of virtual partition tag values which mark changed items that are of interest for the merge. We note that the representative of partition 5C and the representative of partition 5D are both capable of supplying merge information tagged with the partition name 2D or 3D. It is desirable that only one of these two representatives supply this information. This will reduce the amount of information sent over the network to all sites; but more importantly, it reduces the amount of redundant information that must be processed by each of the merging sites. The algorithm in Appendix 12 calculates the set U of all partition tags known by the local virtual partition and unknown by at least one of the other merging partitions. If more than one merging partition can supply the merge information for a partition tag P, we select exactly one of these partitions to provide the merge information of partition P. The selected partition is the one with the largest virtual partition name.

A representative site begins by calculating its virtual partition tag set for the merge. Next the representative constructs a change list by scanning the local system directory and selecting a copy of each record that contains a tag value in the representative's tag set. Every merging site will request the change list information from every representative. Missing results are added to each local directory. Conflicting results are resolved and added to each local directory. When a site has completed the merge recovery and commits to membership in the new virtual partition, that site will have as its partition history the union of all of the partition histories in the merge.

CHANGE LISTS

The information provided by the representative sites must be sufficient to detect missing results, to detect conflicting results, to unilaterally resolve conflicting results, and to ensure the achievement of mutual consistency in future mergers. The information to accomplish these goals is of three types: the current value of a modified item the partition tag associated with the modified item, and control or context information.

Most of the information contained in a change list is selected for inclusion based on the value of an associated partition tag. The items undergoing change in the versioned storage system are the system directory entries rather than the user data. If a client modifies and updates user data, a new version will be created; the storage system will store the new version of the user data and add new records to the system directory. If a client changes the status, accessibility, or ownership of user data, the storage system will modify an existing record in the system directory. Sites maintain mutual consistency by maintaining the mutual consistency of their system directories. Thus, in the IDHSS environment we must associate partition tags with fields in a system directory record. A field must have an associated partition tag if the field may be modified as the direct result of a client request and the field stores a value that must be identical on every site. An example of a field that requires an associated partition tag is the path record field which references the current instance for the path. This field is modified when a client updates the path, and each site in the current virtual partition must have the same value for this field. An example of a field that does not require an associated partition tag is the field which specifies the local representation (full copy, differenced copy, or no copy) of an instance of user data. Because the field contains strictly local information, the value will vary from site to site. It is assumed that if a system directory record contains one or more partition tags whose value is in the tag set, the entire directory record will be included in the change list. This assumption is not necessary but it is sufficient.

The change list is constructed by scanning the entire system directory. As the directory is scanned, two distinct portions of the change list are constructed; control information about group updates executed during the partitions of interest, and copies of all system directory records modified during the partitions of interest. The control information about group updates gives the group update token, the identity of the paths or objects updated, the identity of the instances created by the update, the identity of the predecessor instances, and which group update rule was used to process the update. The second part of the change list must be clustered and ordered by objects. For each path record in the change list all instance records pertaining to that path are grouped with the path record. All of the paths within an object will be clustered together and ordered by the immutable token associated with a path. If an object record appears in the change list, it is grouped with the path records for that object. Finally, object groups are sorted by the immutable token associated with each object. Ordering the change lists in this manner allows each site to perform N-way merge processing on N change lists. If a record appears in only one of the incoming change lists, only one partition modified that record, no conflicts exist and the missing results should be added to the local system directory. If a record appears in multiple change lists, a conflict may exist.

The control information on group updates is necessary because it clusters the group update information by groups of instances. The second part of the change list clusters all information by the object it is associated with. Providing the initial control information avoids the need to repeat all of the instances updated by a group update with each instance as it appears clustered with its object.

Appendix 13 shows an algorithm for processing the change lists during a merge. All control information about group updates is read and saved for use in resolving group update conflicts. Next, the directory record images are processed. For each object O appearing in any change list, the merge and resolution algorithm builds a model object to be incorporated into the local system directory. The initial model consists of an empty object record. All changes prescribed by the change lists are performed on the model object record. If the change is non-conflicting, the new results are copied into the model record and the partition tag field associated with the change is copied into the model record. If the changes are conflicting, the conflicts are resolved, the results are copied into the model record(s) and all partition tag fields associated with values that are determined by the resolution algorithm are set to the name of the new virtual partition being formed. Thus, those sites that are merging to form the new virtual partition are the sites that have knowledge of the results produced by the resolution algorithm. The resolution algorithm may require the addition of new alternate versions to the object. When alternate versions are added to the object O, model path records are added to the model and associated with the model tree record. Model instance records are added to the model in a similar manner. When all change list information about object O has been processed, all model records are incorporated into the local system directory, the model is reinitialized to empty, and the next object specified by one or more change lists is processed.

The algorithm for incorporating the model into the local directory is presented in Appendix 14. Each record in the model is processed individually. If the record specified by a model record exists in the local system directory, the local copy is modified by copying, from the model record to the local copy, each field or set of fields that were modified by any of the merging partitions. A modified field is identified by an associated partition tag field with a value in the range of interest for the merge. The partition tag values in the range of interest for a merge are the union of the partition tag sets of all of the representatives in the merge and the name of the newly formed virtual partition. If the record specified by the model record does not exist in the local system directory, all fields in the model record that pertain to local information (e.g., the physical representation of a local copy of a data instance) must be set to default values and a copy of the model record is added to the local system directory.

A SIMPLE MERGE EXAMPLE

Figure 11A:
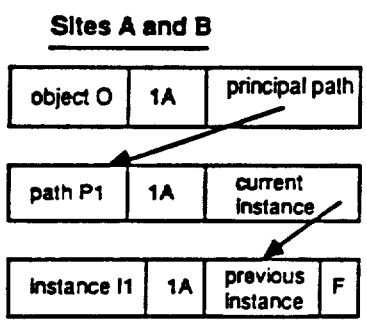
FIG. 11A is a graphical view of the three identical directory records two sites A and B.

Assume an initial environment consisting of a federation of two sites A and B executing in a virtual partition called 1A. The default replication factor for the federation is two A client on site A creates an object O. Sites A and B add three new records to their local system directory. One record describes the object O; a second record describes the principal path in O; a third record describes the current instance in the principal path of O. The object record must contain some reference to the principal path record. Each reference must be implemented as a field in the referencing record. Thus, the object record contains a field that references the principal path record, and the principal path record contains a field that references the current instance record. We associate a partition tag with these two fields and with the instance record. When the records are created the partition tags are set to the current virtual partition name 1A. FIG. 11A shows the three identical directory records on sites A and B.

Figure 11B:
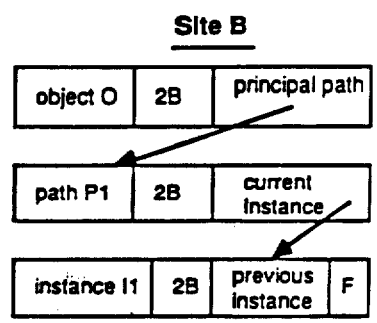
FIG. 11B is a graphical view of the directory records on site B after the divergence recovery.
Figure 11C:
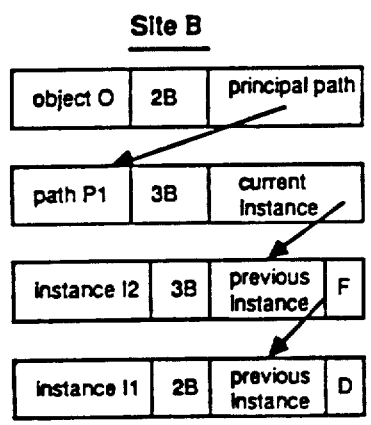
FIG. 11C is a graphical view of the directory records on site B after the execution of the update request.

Suppose sites A and B experience a communication failure. Because a copy of object O resides at both sites, the optimistic access rule allows clients at both sites to checkout and update the object. A client at site B checkouts the object O and updates it. When executing the update request, site B must obtain a lock from site A, the primary site for object O. Site B detects the communication failure and performs a divergence recovery to form partition 3B. The divergence recovery causes the last multicast message from each site to be retagged with the partition stamp 2B. Site B sent no multicast messages. Site-A sent the create multicast message; the results of the create are retagged on site B. FIG. 11B shows the directory records on site B after the divergence recovery. The directory records on site A are not modified. To complete the update request, site B elects itself as the pseudo primary site for object O, a new instance record is added to the local system directory, and the instance reference in the principal path record for object O is modified. The partition tag associated with the new instance record is set to 3B. Also, the partition tag associated with the instance reference in the principal path record is set to 3B. FIG. 11C shows the directory records on site B after the execution of the update request.

Assume that the communication failure is corrected. The finder on site B must detect the correction by sending a liveness message to site A. Site A constructs a new virtual partition name 3A and proposes this name to every known site (sites A and B). Site B rejects the virtual partition name 3A and counter-proposes the virtual partition name 5B. Sites A and B accept the invitation to form partition 5B. Site A reports a partition history of 1A, and site B reports a partition history of 1A, 2B, and 3B. Site A is the representative for partition 1A. The tag set for site A is empty, thus site A does not scan the local system directory. Site B is the representative for partition 3B. The tag set for site B is {2B, 3B}. Site B scans the local system directory for records containing partition tag values of 2B or 3B. All four records in the directory on site B contain partition tags of 2B or 3B. The change list constructed by site B begins with update information about instance I2 as the group update control information. Following the control information is a copy of the four directory records on sites B.

Figure 11D:
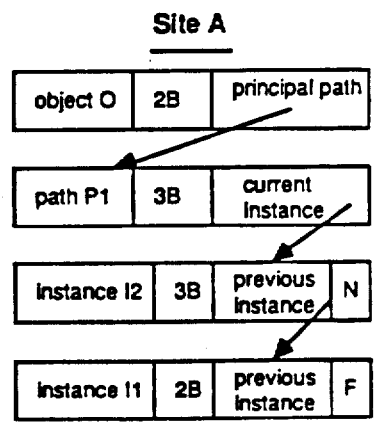
FIG. 11D is a graphical view of the directory records on site A after incorporation.

Sites A and B each obtain a copy of the change list from site B and the null change list from site A. Because only one change list contains information, there are no conflicts to resolve. Site B has nothing to do because the change list from site A is empty. The system directory records on site B remain the same. Site A incorporates the information from site B's change list into the local system directory. FIG. 11D shows the directory records on site A after the incorporation. Site A must determine that the object record, the principal path record, and the I1 instance record have been modified by the sites in another partition and should be modified locally. Incorporating the modifications to these three records does not mean that the old versions of the records are simply overwritten. In the case of the instance record for I1, the local representation value must remain as full. The record for instance I2 does not exist locally, thus it is a new record to be added to the system directory. Before adding the record, the local representation field must be set to a default value of none.

THE PHILOSOPHY OF CONFLICT RESOLUTION

The resolution algorithm used during merge recovery should meet two requirements:
1. the resolution algorithm must ensure that the mapping from external name to internal data instances is a one-to-one mapping, and
2. the resolution algorithm must produce a mutually consistent view of the system among the merging sites.

There are four properties of the resolution algorithm that are desirable from an implementational point of view:
1. the resolution algorithm should be as simple as possible,
2. the resolution should be achieved with a minimum amount of "undo/redo" effort by the system,
3. the resolution should not appear to be ludicrous to any of the clients, and
4. the resolution algorithm should not require additional voting by the merging sites.

That is, the resolution algorithm should depend solely on the changes that were made, what site initiated the change and what virtual partition that site was a member of when the change was made.

Requirement 4 allows the resolution algorithm to be employed unilaterally by each site in the merger. When two or more virtual partitions merge, two types of request conflicts can occur.
1. "Merge-able" conflicts are conflicts where the results produced by each conflicting request are modified and added to the system in a non-conflicting way.
2. Direct conflicts are conflicts where the results produced by exactly one of the conflicting requests will prevail and be added to the system.

Table IV classifies pairs of conflicting IDHSS write requests as merge-able conflicts, direct conflicts, or a combination of both.

TABLE IV

| Request Pairs |
|---|
| Non-Conflicting |
|     checkout, read, return, name__match |
| Merge-able |

TABLE IV-continued

Request Pairs

```
    (erase_all, X ; where X = name, create,
    derive, set_permission, grant, deny, assign,
    new_owner, usurp)
Conflicts
    (delete, X ; where X = name, create, derive,
    set_permission, grant, deny, assign, new_owner,
    usurp)
    (name, name) (create, create) (derive, derive)
    (name, create) (name, derive) (create, derive)
    (grant, grant) (deny, deny) (grant, deny)
    (set_permission, grant) (set_permission, deny)
    (update, update)
Direct Conflicts
    (assign, assign) (erase_all, update)
    (delete, update) (new_owner, new_owner)
    (usurp, usurp) (new_owner, usurp)
Merge-able or
Direct Conflicts
    (set_permission, set_permission)
```

Two write request types A and B form a "conflict pair" (A, B) if there exists a write request A' where A' operates on a data object X and A' is a request of type A, and if there exists a write request B' where B' operates on X and B' is a request of type B, and A' and B' are conflicting requests.

The most intricate resolutions involve merge-able conflicts. The merge-able conflicts are resolved by selecting one of the conflicting requests as a winner, modifying the results of the losing conflicting requests, and adding all of the results to the system directory. In the case of direct conflicts, only one result will be selected and added to the system directory. When direct conflicts occur, there is in general no semantic basis for selecting one result to prevail over another result. The goal of the resolution of direct conflicts is to make the best choice (when best can be ascertained) and to make a mutually consistent choice.

The resolution algorithm must resolve all of the conflict pairs classified in Table IV. The resolution of each conflict pair is not totally independent of each other. Some conflict pairs are resolved simultaneously (such as (name, name) and (create, create)), because the pairs represent the same kind of conflict and are resolved by a single algorithm. Some conflict pairs must be resolved before others (such as (derive, derive) before (update, update)), because their resolution produces information that affects the outcome of other resolutions.

THE RESOLUTION PROTOCOLS

The resolution of the requests processed by N distinct virtual partitions is an N-way merge of the N change lists representing those partitions. Some conflicts involve multiple objects such as group updates or naming conflicts. Each change list begins with control information about group updates. This information is read and saved for use in resolving conflicting group updates. The remaining information in the change lists is processed one object at a time.

NAME CONFLICTS

The name request, create request, and derive request may be in conflict with each other by adding duplicate user-defined object base names to the system. A naming conflict is a merge-able conflict. Each user-defined name has an invisible suffix consisting of the defining user's name and the name of the site where the creating request was issued. These duplicate user-defined names are merged by making the invisible suffix visible. The addition of the suffix will make the name unique among all names in a federation. Therefore, the resolution of (name, name), (create, create), (name, create), (name, derive) and (create, derive) conflicts is achieved automatically by propagating the results of the requests to each of the merging partitions.

ASSIGN CONFLICTS

When building the model object record for an object O, all conflicting assign requests on object O must be resolved. When an assign request is executed, the request modifies an object record in two ways: first, the principal path field is altered, and second, a partition tag field associated with the changes to the principal path field is set to the name of the current virtual partition. If multiple change lists contain the object record with a principal path partition tag field whose value is in the range of interest, an assign conflict has occurred. All assign conflicts are direct conflicts. The merged result will represent the selection of one of the assigns as the winning assignment. The winning assign is the principal path from the change list record whose partition tag value is the largest. Appendix 15 presents an algorithm for resolving conflicting assign requests.

The resolution algorithm for conflicting assign requests selects the same winning assign requests on every merging site.

OWNERSHIP CONFLICTS

New_owner requests may represent direct conflicts that affect the object record and path records. When a new_owner request is executed two fields are modified in the object record or in a path record: the owner field is changed to a different user, and a partition tag field associated with changing the owner field is set to the name of the current virtual partition. If multiple change lists contain the object record for object O and the partition tag field associated with change in the owner field is in the range of interest, a new_owner conflict has occurred. The conflict is resolved by selecting the new owner that has the largest value for its associated partition tag field.

New_owner conflicts for paths are managed analogously to new_owner conflicts for objects however, new_owner requests on paths may conflict with usurp requests on paths. Each path record contains a partition tag field associated with a change of ownership by a usurp request. Only the object owner may perform a usurp request. The object owner is considered to be more powerful than the path owner; therefore, in general, the usurp will prevail over the new_owner request. A difficulty arises when there has been a new_owner conflict for the object itself. In such a case, the winning usurps should be consistent with the winning new owner for the object. This consistency is achieved by selecting winning usurps from the same change list as the winning new owner for the object. Each change list represents a portion of the consistent view held by one of the merging partitions; therefore, by selecting winning usurps from the same change list we are achieving a consistent view of ownership. Appendix 16 presents the algorithm for resolving conflicting change of ownership requests.

PERMISSION CONFLICTS

The set_permission request can produce merge-able conflicts and direct conflicts. Set_permission is used to modify the general permission setting and to add or delete users from the inclusion and exclusion lists. Each entry in the inclusion or exclusion list has an associated partition tag. This tag value states in which virtual partition the entry was added, or the permission associated with this client was modified, or the entry was marked as deleted. Modifications to the inclusion and exclusion lists are merge-able. The resolution algorithm for resolving changes to the inclusion and exclusion lists adds each new permission entry to the model, unions the permitted operations of two entries for the same user, and marks the model entry as deleted if any change list claims that the entry is deleted. The results of grant requests and deny requests are merged in the same manner as inclusion and exclusion modification resulting from a set_permission request. When incorporating the inclusion and exclusion lists into the local system directory, each entry must be treated as a distinct record and all modifiable fields are considered to have been modified.

Modifying the general permission setting is a direct conflict that is resolved by selecting the general permission setting that is most restrictive. The general permission settings from most restrictive to least restrictive are private, private-include, public-exclude, public. Appendix 17 presents the algorithm for resolving conflicting permission requests.

The resolution of conflicting set_permission requests and grant and deny requests result in the same set of permissions on every merging site.

DERIVE CONFLICTS

Derive requests conflict with other derive requests by creating a duplicate name or by associating the same implicit alias number with different paths. All duplicate means are managed by the merge protocol as discussed in the subsection on naming conflicts. Conflicting implicit alias numbers are manifested by two logically distinct paths with distinct immutable tokens having the same implicit alias number. Implicit alias numbers for one object are unique within a single partition; therefore, if K partitions are merging, there may be at most K logically distinct paths with the same alias number. In such a case (K−1) of the paths must be given new unique implicit alias numbers. The (K−1) new implicit alias numbers are selected by determining the largest alias number used in an object up to this point in time and assigning increasingly larger alias numbers to each new path in a well-defined order. A well-defined order is achieved by processing the (K−1) paths in the order determined by the means of the virtual partition that proposed the path. Because implicit alias numbers are generated in increasing order per object, the largest implicit alias number used in object O can be unilaterally calculated by each site in the merge.

When a site has calculated the largest implicit alias number used for an object O, all of the model paths that cannot retain the alias number originally assigned will be ordered by partition name and assigned unique alias numbers. Appendix 18 presents an algorithm for resolving duplicate alias numbers. The assignment of new implicit alias numbers is done in a well-defined order making the assignment mutually consistent on the merging sites.

DELETION CONFLICTS AND PHYSICAL DELETION

The delete request and the erase_all request may conflict with almost all of the other requests. All deletion conflicts are classified as merge-able conflicts except when deletion conflicts with update. When a deletion request is executed, the affected instances are logically rather than physically removed. When a change list entry states that a system directory record has been logically deleted, that logical deletion is always propagated to the corresponding model record unless the deletion conflicts with an update request. When one partition updates a path that has been deleted in another partition, the update must be saved. If an update request follows a delete request in the same partition, the update will fail. This is acceptable, but once the update has been accepted by one partition it may not be rejected regardless of the reason. This is in keeping with the general system philosophy of "never throw away user data". Saving the update requires that some or all of the deleted instances be reincarnated. If an update has been performed by one of the merging partitions, these records will be reincarnated and the updates will be added according to the resolution algorithm for resolving (update, update) conflicts.

When an object or path is logically deleted, the records that describe the object or path will be processed by merge recovery as if they were not deleted; that is, the merge and resolution algorithms for name conflicts, assign conflicts, ownership conflicts, permission conflicts, and derive conflicts are applied to the logically deleted records, but the records remain logically deleted. The state of being deleted is merged with the results of other requests so that the records that describe the deleted object or path remain mutually consistent among the communicating sites. It is beneficial to maintain the mutual consistency of these records in the event that a conflicting update request may be encountered in a future merge recovery, forcing the reincarnation of the deleted entity. When the entity is reincarnated, the reincarnation must be mutually consistent on all merging sites.

All of the instances affected by a delete or erase_all may be physically removed when it has been ascertained that there will be no need to reincarnate any of these instances in a future merge recovery. Physical deletion may take place only after all sites in a federation have merged to form one virtual partition, and all sites know that every other site has committed to that new virtual partition. The algorithm for determining when and if this state is achieved is presented in Appendix 19.

The algorithm must be initiated at the end of a merge recovery. The required condition of full membership in the forming virtual partition is easily tested by examining the partition commit message. If the commit message specifies that full membership should result from the merger, each site determines that every other site has actually completed the merge recovery and committed to the new unanimous partition by keeping track of the sites from which multicast messages have been received. Once a site S has sent a multicast message and has received a multicast message from every other site, the site S may physically delete all of the logically deleted data. During the existence of the virtual partition with full membership, all client requests for deletions must be processed as logical deletions rather than physical deletions. The request processing protocol uses one-phase commit for sending multicast messages. If a site or communication failure occurred during the multicast sending of deletion results, the sites that received the message would perform physical deletion. The sites that did not receive the message could form new virtual partitions and honor requests that necessitate the reincarnation of the physically deleted data during a future merge recovery. The algorithm for determining when and if physical deletion is allowed determines that it is acceptable to physically delete everything that has been logically deleted prior to the formation of the new virtual partition; the algorithm does not allow us to draw conclusions about future deletions.

When an update request conflicts with an erase__all request, the update must be saved. In this case, it is possible to honor the logical erase and save the update by placing the new instance formed by the update in a new alternate path derived from the path that has been erased. All instances that are common between the old erased path and the newly derived path must be reincarnated. A resolution algorithm for resolving (update, update) conflicts automatically forms new alternate version paths for the instances created by losing update requests. The facility is used by designating the conflicting update request to be a losing update so that the new instance created by the update is always placed in a new alternate version path by the update resolution algorithm. The update resolution algorithm will use the group update control information at the beginning of the change list to select winning and losing updates. Designating the update as a losing update means that we must locate this update in the control information we have saved and mark the update as a losing update. The erase request is honored by marking the model path record as deleted. Appendix 20 presents an algorithm for resolving conflicts between update request and erase__all requests.

When one partition performs an update on any path in an object that has been deleted in another partition, the update must be saved. Whether or not the update will be selected as a winning update or a losing update, all instances of the object must be reincarnated. We reincarnate the entire object rather than just the path affected by the update to ensure that every object has a principal version path. An object without a principal version path could result when a conflicting update request has updated a non-principal path. Reincarnating the object means that all records describing the object must be added to the model and must be marked as undeleted. When the object record is incorporated into the local system directory, if the local directory contains the object record, the deletion indicator must be removed. The result of the update will be added to the model by the algorithm for resolving conflicting updates. Appendix 20 presents an algorithm for resolving delete or erase__all requests that conflict with update requests.

RESOLVING GROUP UPDATE CONFLICTS

A single virtual partition manages conflicting updates within that partition by the creation of alternate versions. When multiple virtual partitions merge, update conflicts may arise between updates performed in separate partitions. The resolution algorithm manages group update conflicts by selecting a collection of non-conflicting group updates as "winning" updates and resolving conflicting updates by creating alternate versions.

The selection of winning updates is based on the selection of non-conflicing updates. However, the state of being non-conflicting is not sufficient for selection as a winning update. The selection of winning group updates is controlled by four requirements:

1. A winning group update must not conflict with any other winning group update.
2. Every instance created by a winning group update is a winning instance and will remain in the version path it was placed in by the update.
3. If an instance I, in a version path P, is created by a winning group update G, every instance that is a predecessor of instance I in path P must be the result of a winning update.
4. If an instance I, in a version path P, is created by a losing group update G executed, every instance that is a successor of instance I must be the result of a losing update.

The first condition requires that for each path, only updates from one partition may be selected as winning updates for that path. The second condition requires that all instances resulting from a winning group update will prevail as winning instances. To support this requirement the system must maintain information on the group update relationship among all instances. When a group update is executed by the storage system, each group update is assigned a unique immutable token. Each instance record in the system directory will record the token corresponding to the update that created the instance. The third and fourth conditions require that a sequence of updates to a path performed by one partition must begin with zero or more winning updates followed by zero or more losing updates. The wining and losing updates may not be interspersed in such a sequence.

When a group update G is selected as a winning update, every update that conflicts with G must be a losing update. In an attempt to minimize the amount of change brought about by the resolution procedure, we will attempt to maximize the number of winning updates. There are at least two ways to measure the number of winning updates. Consider the following model of group updates.

Let $P_1, P_2, \ldots N$ be virtual partitions involved in a merge.

Let $G_{i,1}, G_{i,2}, \ldots G_{i,n}$ be group updates executed in virtual partition $P_i$.

Let $x_{i,j,1}, x_{i,j,2}, \ldots x_{i,j,m_{i,j}}$ be version paths updated by the group update $G_{i,j}$.

Two group updates $G_{i,j}$ and $G_{k,l}$ conflict iff $x_{i,j,r} = x_{k,l,m}$ for some r, $1 \leq r \leq m_{i,j}$ and some s, $1 \leq s \leq m_{k,l}$ and if$\neq$k. The conflict relationship is symmetric; if A conflicts with B, then B conflicts with A. There are no conflicts among the set of updates executed in a single partition.

Define the set of winners $$W = \left\{ G_{i,j} \middle| \begin{array}{l} \text{if } G_{i,k} \text{ created an instance that is a} \\ \text{predecessor of an instance created by} \\ G_{i,j} \text{ then } G_{i,k} \in W \\ \text{and if } G_{i,j} \in W \text{ and } G_{r,s} \in W, \\ G_{i,j} \text{ does not conflict with } G_{r,s} \end{array} \right\}$$

Two possible criteria for selecting a maximum number of winning group updates are:

1. maximize $\sum m_{i,j}$ $\{i,j | G_{i,j} \in W\}$ 2. maximize $|W|$

Criteria one maximizes the number of winning version paths from the group updates. Criteria two maximizes the number of winning group update requests. These two criteria are not equivalent. Consider the following example:

Let $P_1$, $P_2$, and $P_3$ be three virtual partitions. Let $x_1$, $x_2$, $x_3x_4$, $x_5$, $x_6$, $x_7$, and $x_8$ be objects known in the three partitions. The group updates executed in these partitions were:

$G_{1,1}$ = update $x_1$, $x_2$, $x_3x_4$, $x_5$
$G_{2,1}$ = update $x_1$, $x_2$
$G_{2,2}$ = update $x_5$, $x_6$, and
$G_{3,1}$ = update $x_7$, $x_8$.

The conflict sets are:
 $G_{1,1}$ conflicts with $\{G_{2,1}, G_{2,2}\}$
 $G_{2,1}$ conflicts with $\{G_{1,1}\}$
 $G_{2,2}$ conflicts with $\{G_{1,1}\}$, and
 $G_{3,1}$ conflicts with $\{\}$.

The two solution sets are:
 Winners$_1$ = $\{G_{1,1}, G_{3,1}\}$
 Winners$_2$ = $\{G_{2,1}, G_{2,2}, G_{3,1}\}$.

Three virtual partitions P1, P2, and P performed the group updates $G_{1,1}$, $G_{2,1}$, $G_{2,2}$ and $G_{3,1}$. Update $G_{1,1}$ conflicts wit update $G_{2,1}$ and update $G_{1,1}$ conflicts with update $G_{2,2}$. The set Winners 1 is the set of winning group update according to criteria 1. The set Winners2 is the set of winning group updates according to criteria 2.

Maximization by either criteria can be expressed as a problem in integer programming. We define the problem of selecting a maximal collection of winning group updates as follows. Let P be the set of merging virtual partitions:

$P = \{P_i | 1 \leq i \leq I\}$.

Let X be the set of version paths known by any of the merging partitions:

$X = \{x_j | 1 \leq j \leq J\}$.

Let G be the set of group updates:

$G = \{G_k | 1 \leq k \leq K \text{ and each } G_k = \{x_j | x_j \epsilon X\}\}$.

Define the function $f$: $(P,X) \rightarrow \{G, \theta\}$ to map a virtual partition and a version path to the set of group updates performed on that path by sites in that partition.

$$f(P_i, x_k) = \left\{ \begin{array}{c} G_k \mid x_j \, x\epsilon \, G_k \\ \text{and} \\ G_k \text{ was executed in partition } P_i \end{array} \right\}$$

Define the function pred: $(P,X,G) \rightarrow \{G, \theta\}$ to map an instance to the set of group updates that created the immediate predecessor instances created by any of the merging partitions.

pred $(P_i, x_k, G_k) =$ $$\left\{ \begin{array}{c} G_1 \text{ created an instance of } x_j \text{ that is a} \\ G_1 \mid \text{predecessor of the instance of } x_j \text{ created} \\ \text{by } G_k \text{ and reported by partition } P_i \end{array} \right\}$$

The function $f$, from the domain of partitions cross version paths to the range of group updates, is a one-to-many function. In a single partition P, a version path x may have been updated by several group updates. The function pred, from the domain of partitions cross version paths cross group updates to the range of group updates, is a one-to-many function. In a single partition, each instance has zero or more predecessor instances and each of those instances was created by a distinct group update.

To maximize the number of winning update version paths (meeting criteria one), we define a selector paths (meeting criteria one), we define a selector function s1: $(P,X,G) \rightarrow \{1,0\}$ to select the winning paths. The selector function s1 is one-to-one.

The goal is $$\text{maximize} \sum_{i=1}^{I} \sum_{j=1}^{J} \sum_{k=1}^{K} s1_{ijk} \text{ subject to}$$

$$s1_{ijk} = \left\{ \begin{array}{l} 1 \quad \text{if } f(P_i, x_j) \supset G_k \text{ and} \\ \quad a) \quad s1_{aj1} = 0 \, \forall \, a \neq i \text{ and } \forall \, 1 \neq k \\ \quad b) \quad s1_{ijl} = 1 \text{ if } G_1 \subset \text{pred}(P_i, x_j, G_k) \\ \quad c) \quad s1_{ibk} = 1 \text{ if } f(P_i, x_b) \supset G_k \\ 0 \quad \text{otherwise} \end{array} \right.$$

To maximize the number of winning group update requests (meeting criteria two) we define a selector function s2:(G)$\rightarrow\{1,0\}$ to select the winning update requests. The selector function s2 is one-to-one.

The goal is Maximize $$\sum_{i=1}^{I} s2_i$$

subject to $$s2_i = \left\{ \begin{array}{l} 1 \quad \text{if } f(P_i,x_k) \supset G_i \text{ and} \\ \quad a) \quad s2_1 = 0 \, \forall \, G_1 \subset f(P_a,c_k) \text{ where } a \neq j \\ \quad b) \quad s2_1 = 1 \, \forall \, G_1 \subset \text{pred}(P_j,x_k,G_i) \\ 0 \quad \text{otherwise} \end{array} \right.$$

The problem of integer programming is NP-Complete. An an approximate solution to the problem is employed using heuristics to select a large set of conflicting group updates. Our heuristics allow us to assign a "goodness" value to each of the group updates to be merged. The set of group updates is ordered by their associated goodness value. A linear greedy algorithm scans the updates in order and selects collections of related non-conflicting group update as the winning updates.

The heuristic for ordering the set of group updates is a combination of criteria one (to maximize the number of winning version paths) and criteria two (to maximize the number of winning update requests). We measure the effect of a group update G on the number of winning version paths by counting the number of version paths updated by G. This factor estimates the user time cost associated with an update. We assume that the number of versions updated in one request is directly proportional to the user effort expended in preparing the data to be updated. If an update results in the creation of alternate versions, the user may perform additional work to manage or merge those versions. Giving preference to group updates with greater breadth should reduce the additional user effort required in managing undesired alternate versions. We measure the effect of an update G on the number of winning update requests by counting the number of updates that are predecessors to G. If update G is selected as a winning update, all of the predecessors to G must also be winning updates; thus, we are giving preference to longer chains of updates. These longer update chains reflect more update activity for these versions. We assume that more update activity means that the end-users have invested a larger amount of effort than was expended on versions with fewer updates. Giving preference to the longer chains of updates is again an attempt to conserve user effort by selecting those updates that may be associated with a large use time cost. When calculating a goodness value for a group update, we give preference to criteria one over criteria two by doubling the count corresponding to criteria one before adding the count contributed by criteria two. The goodness value of a group update G is suitably twice the number of version paths updated by G plus the number of predecessor updates for G that are reported by any of the merging partitions.

The number of version paths updated by one group update is information that is readily available in the group update control information of the change list. In order to count the number of predecessor updates for a group update G, the set of predecessor updates is first constructed. The set of predecessor updates is also used in the greedy algorithm to select the set of winning updates. The predecessor sets are calculated from the group update control information contained in the change list. Appendix 21 presents the algorithm for determining the set of predecessor updates for a given group update G. The predecessor updates are those updates that created instances which are predecessors to the instances created by group update G. Each instance reported in the change list control information reports its immediate predecessor instance. Using the information on immediate predecessors, we construct an ancestral instance chain dating back to the last ancestral version reported by any of the merging partitions. The group updates that created these instances are the set of predecessor updates.

Once the set of predecessor updates have been calculated, a goodness value is computed for each group update and the updates are ordered by goodness value. If the goodness value is not unique, the name of the partition reporting the update is used as a secondary sort key. If the goodness value and the name of the reporting partition are not unique, the group update token associated with the update is used as a ternary sort key. Each group updates token is globally unique; therefore, the set of group updates form a total ordering. This total ordering determines the order in which the updates will be processed when selecting winning group updates.

Appendix 22 presents an algorithm for selecting winning group updates. The algorithm uses the conflict relationship defined hereinabove: two group updates conflict if the two updates were executed in different partitions and the set of version paths updated by each has a non-empty intersection. We use the set of predecessor updates to select the set of related winning updates and the set of successor updates to select the set of related losing updates. For a group update G, the predecessor updates are calculated by our previous algorithm. The set of successor updates for G are those updates, that created one or more instances which are successors to the instances created by. The sucessor instances are reported in the same change list as G and are restricted to those instances belonging to the same version path as the instance created by G. A group update is selected as a winning group update only if all of its predecessor updates do not conflict with any of the previously selected winning updates.

The fact that this algorithm yields only an approximation to the true maximal solution is seen by considering three group updates $G_{1,1}$, $G_{2,1}$, and $G_{3,1}$, with goodness values 7, 5, and 4 respectively. Suppose $G_{1,1}$ conflicts with $G_{2,1}$ and $G_{3,1}$, but $G_{2,1}$ does not conflict with $G_{3,1}$. Our algorithm would begin by selecting $G_{1,1}$ as a winning update, $G_{2,1}$ and $G_{3,1}$ cannot be selected as winning updates, so our total goodness value for winning updates is 7 and the total goodness value for losing updates is $(5+4)=9$. The true maximal solution is to select $G_{2,1}$ and $G_{3,1}$ as winning updates.

PROCESSING LOSING GROUP UPDATES

Creating alternate version paths for instances created by losing group updates poses three problems. First, if one partition performed K updates on a path and the L most recent of these updates ($K \geq L$, $L > 1$) were declared to be losing updates, then the corresponding L losing instances should be placed in only one, rather than L, new alternate version paths. Second, each site performing the merge processing must unilaterally create the same name and assign the same implicit alias number to a newly created path. Third, creation of alternate paths must support configuration write consistency.

GROUPING LOSING UPDATE INSTANCES

For each path in an object, at most one new alternate path may be created per partition involved in the merge. Basically this says that if K partitions propose a set of instances as the continuation for a path, then at most K new alternate paths need to be created (one per partition). The problem is solved by grouping temporally related instances created by a single partition. An association among the temporally related losing versions formed from a single partition and the losing versions are placed in one alternate path.

UNILATERAL GENERATION OF IMPLICIT ALIAS NUMBERS AND TOKENS

A second problem is how to create the same alternate paths unilaterally on each site. Two paths are the same path if they have the same implicit alias number and the same immutable token. Thus, we must solve two subproblems. First, each site must assign the same implicit alias number to the same logical path. The assigned implicit alias numbers must be unique in the set of implicit alias number for the affected object and must be generated in increasing order. Second, each site must assign the same immutable token to the same logical path. The assigned token must be unique in the space of all tokens.

Each site is able to assign the same implicit alias number to a new path by first, determining the largest alias number used in an object up to this point in the merge algorithm and second, assigning increasing alias numbers to each new path in a well-defined order. The largest implicit alias number used in an object O is unilaterally computable from the local system directory and the change lists. After resolving all conflicting derive requests, the largest implicit alias number used in an object O is the maximum of:

1. the largest implicit alias number appearing in the change list records about paths in object O, 2 the largest implicit alias number used in object O according to the local system directory, and 2. the largest implicit alias number used when resolving derive conflicts in object O.

A well-defined order for assigning the new alias numbers is achieved by ordering the paths, first by their immutable tokens and second by the virtual partition that proposed the path. By this method, each new alternate path is assigned the same implicit alias number by every merging site.

Each new alternate path is assigned a unique immutable token by preallocating a token for the alternate path. The preallocation is performed as part of the normal update processing. When an update is executed an immutable token is generated to represent the new instance. A second token is generated and associated with the new instance. If the update which created this new instance is found to be in conflict with another update at merge time, the second token associated with the losing instance is used as the token for the new alternate path. A new alternate path may contain several instances. The token for the new path is the second token associated with the current instance on that path. Thus, each site participating in the merge assigns an implicit alias number and an immutable token to a new alternate path in a mutually consistent manner.

MAINTAINING CONFIGURATION WRITE CONSISTENCY

During normal processing, the storage system supports configuration write consistency in group updates by applying a set of group update atomicity rules to determine which updates within the group will be processed normally and which updates will result in the creation of alternate versions. When the storage system resolves update conflicts in a merge recovery by demoting some of the updates to alternate versions, the demotion process must maintain configuration write consistency by applying the same group update rules used during normal processing. Additional information is required to properly apply the atomicity rules during a merge recovery. In particular, we must know the status of the set of items at the time of the original processing of the group update. This is accomplished by recording in each instance record which group update rule was applied during the original execution of the update. This information is part of the control information on group updates and allows the resolution algorithm to determine whether or not all of the items in a group must be demoted to alternate versions. If the original update produced only new current versions for principal paths, (i.e. rule one for configuration write consistency was applied), all of the items updated by this group update must be placed in new alternate paths.

Figure 12:
FIG. 12 is a graphical view of a merge of two partitions.
Figure 12:
Figure 12:
Figure 12:
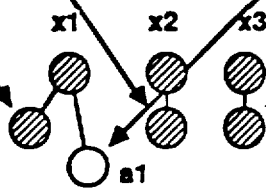

If any other rule for configuration write consistency was applied, it may be possible to retain parts of the group update as successful updates. FIG. 12 shows a merge of two group updates $G_{1,1}$ and $G_{2,1}$ performed in partition P1 and P2 respectively. We assume that these are the only updates in the merge. Update $G_{1,1}$ has been selected as a winning update, forcing update $G_{2,1}$ to be a losing update. If update $G_{2,1}$ was not executed under the constraints of configuration write consistency rule number one, the new instance of x3 created by $G_{2,1}$ may remain in the path x3. Because $G_{1,1}$ is the winning update, the new instance for x1 supplied by update $G_{2,1}$ must be placed in a new alternate path a1. Allowing update $G_{2,1}$ to be a partially successful update is possible only because $G_{2,1}$ was not a type one group update and there is no other partition proposing a different set of instances as the continuation of path x3.

Figure 13:
FIG. 13 is a graphical view of a merge of three partitions.
Figure 13:
Figure 13:
Figure 13:
Figure 13:
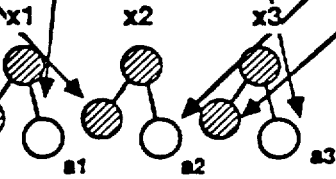

In FIG. 13, we add to the merge the group update $G_{3,1}$ performed in partition P3. Again update $G_{1,1}$ is selected as a winning update and updates $G_{2,1}$ and $G_{3,1}$ are both losing updates. The new instance for x1 supplied by update $G_{2,1}$ must be placed in a new alternate path a1. The new instance for x2 supplied by update $G_{3,1}$ must be placed in a new alternate path a2. The updates $G_{2,1}$ and $G_{3,1}$ are in conflict for achieving partial update success for path x3. Only one of these two updates may be selected for partial update success on path x3. Because this is a direct conflict, any unilaterally computable algorithm may be used to select the update that will be partially successful. We select the update proposed by the virtual partition with the largest name as the partially successful update. This produces the merge and resolution shown in FIG. 13.

Appendix 23 presents an algorithm for adding to the model all new and existing path and instance records created by updates executed in any of the merging partitions.

NOTIFICATION OF NEW ALTERNATE VERSIONS

Resolving conflicting updates by creating new alternate versions does not change the user data that is stored by the system, but it does change the name used to reference some of that data. When a client C performs the operation "update Obj1", a successful return means that the version of Obj1 installed by this update is named or can be referenced by the name Obj1. If at a later time a merge recovery concludes that this update conflicts with an update performed in another partition and this update is the losing update, the new data installed by client C will be placed in an alternate version of Obj1 and must be referenced by the name Obj1(#), where # is the appropriate implicit alias number for this alternate version path. Client C must be notified of this change of name.

The notification itself must specify what the conflict was, what client performed the conflicting request, what resolution was performed, and what changes have been made to the mapping of external names to user data instances. Both the winning and the losing client should be informed of the conflict and its resolution. When the clients are end-users, it is likely that they will talk about the conflicts and negotiate a true merge of their respective modifications.

ATOMIC MERGE RECOVERY

When requests are processed by the storage system, they are performed atomically. The same is true of a merge recovery. Either all results of the recovery are committed or none of the results are committed. Atomicity is at risk when a site or communication failure occurs during merge recovery. When a site fails to complete a merge, the site reverts to the previous state and begins negotiating a new virtual partition from that state.

If the merge recovery is performed in an atomic manner, the previous state of the system may be restored at any time prior to committing all results of the merge recovery. Atomicity of a merge recovery can be accomplished in one of two ways. A site may write and maintain a special undo log that records all modifications made during the merge. If the merge fails due to a site crash or loss of communication with a representative site, the undo log is used to remove all results of the merge process from the local system directory. A second approach is to make a checkpoint of the entire local system directory prior to processing the merge information. The merge recovery is performed on one copy of the system directory. If the merge process fails, the modified local directory is replaced by the checkpoint version, moving the state of the site back to the state held prior to the attempted merge. Both approaches are sufficient.

EXAMPLE USING THE UPDATE RESOLUTION ALGORITHM

Figure 14:
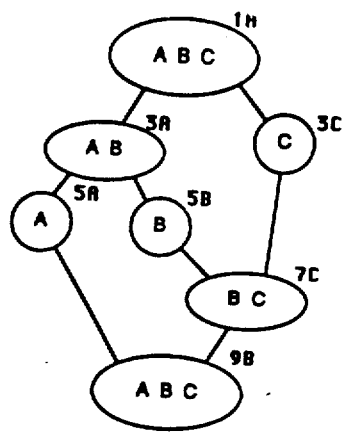
FIG. 14 is a graphical view of partitioning behavior of three sites A, B, and C.

Consider three sites A, B, and C and the partitioning behavior shown in FIG. 14. Initially all three sites are members of partition 1A. A communication failure results in the creation of virtual partitions 3A and 3C. A second communication failure between sites A and B result in virtual partitions 5A and 5B. A merger of 5B and 3C produces partition 7C, which in turn merges with partition 5A to form partition 9B. This example illustrates the effects one merge has on a subsequent merge.

Figure 15:
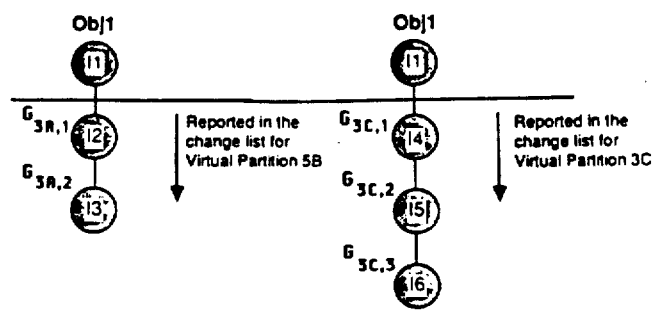
FIG. 15 is a block diagram of the updates performed by two partitions on one object.

An object Obj1 is created in partition 1A. The object Obj1 consists of a single instance I1 and is not updated during the existence of partition 1A. FIG. 15 shows the updates performed by sites A, B, and C on Obj1 in partitions 3A, 3C, and 5B. These updates constitute the updates of interest for the merge recovery forming partition 7C.

During partition 3A, two updates were executed adding two instances I2 and I3 as successors to instance I1. The partition tag value associated with these three instances is 3A. Partition 3C executed three update to the principal version of Obj1 adding three instances I4, I5, and I6 as successors to instance I1. The partition tag value associated with these three instances is 3C. No updates were performed during partition 5B; therefore, the view of Obj1 in partition 5B is the same of the view of Obj1 held in partition 3A. Partition 5B and 3C merge to form partition 7C. Partition 5B has partition history 1A, 2A, 3A, 4B, and 5B. Partition 3C has partition history 1A, 2C, and 3C. The representative of partition 5B builds a change list containing all information with an associated partition tag value of 2A, 3A, 4B, or 5B. The representative of partition 3C builds a change list containing all information with an associated partition tag value of 2C or 3C. Thus for the example of FIG. 15:

Updates with partition tag value = 3A:

$G_{3A,1}$ = update Obj1 = {I2}

$G_{3A,2}$ = update Obj1 = {I3}

Updates with partition tag value = 3C:

$G_{3C,1}$ = update Obj1 = {I4}

$G_{3C,2}$ = update Obj1 = {I5}

$G_{3C,3}$ = update Obj1 = {I6}

Updates with an partition tag value = 5B:

None

Information on instance I1 is included in the change list only in the sense that instance I2 and instance I4 refer to it as their immediate predecessor. From the change list control information on group updates we must compute the set of predecessor updates and the set of successor updates for each group update reported prior to selecting the winning updates. Table V shows the information computed for merging partitions 5B and 3C.

TABLE V

| Group Update | Paths Updtd | Pred. Updts. | # Pred. Updts | Succ. Updts | # Ent. Updts | Gdness Value |
|---|---|---|---|---|---|---|
| $G_{3A,1}$ | Obj1 | { } | 0 | {$G_{3A,2}$} | 1 | 2 |
| $G_{3A,2}$ | Obj1 | {$G_{3A,1}$} | 1 | { } | 1 | 3 |
| $G_{3C,1}$ | Obj1 | { } | 0 | {$G_{3C,2}$, $G_{3C,3}$} | 1 | 2 |
| $G_{3C,2}$ | Obj1 | {$G_{3C,1}$} | 1 | {$G_{3C,3}$} | 1 | 3 |
| $G_{3C,3}$ | Obj1 | {$G_{3C,1}$, $G_{3C,2}$} | 2 | { } | 1 | 4 |

Goodness Value:
(2 * #Entities Updated) + #Predecessor Updates
Prescribed Processing Order:
$G_{3C,3}$, $G_{3C,2}$, $G_{3A,2}$, $G_{3C,1}$, $G_{3A,1}$
Winners = {$G_{3C,3}$, $G_{3C,2}$, $G_{3C,1}$}
Losers = {$G_{3A,2}$, $G_{3A,1}$}

The goodness value assigned to each update, the name of the partition reporting the update, and the group update token assigned to the update are used to prescribe a processing order for selecting the winding updates.

To select the winning and losing updates we begin by selecting update G3C, 3 and its predecessors G3C, 2 and G3C, 1 as winning updates. The partition tags associated with the instances created by these winning updates retain their current value of 3C. The three winning updates are removed from the processing list. The next update to be considered is $G_{3A,2}$. This update conflicts with all three updates in the set of winning updates; therefore, update $G_{3A,2}$ and all of its successor updates are placed in the set of losing updates. The partition tag associated with the instances created by these losing updates is set to the new partition name 7C. The last update to be considered is update $G_{3A,1}$. This update also conflicts with all three winning updates; therefore, update $G_{3A,1}$ and all of its successor updates are placed in the set of losing updates. The partition tag for these losing updates is set to the new partition name 7C.

Figure 16:
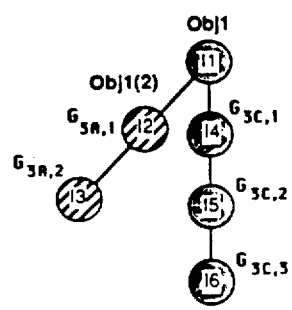
FIG. 16 is a graphical view of the object of FIG. 15 following a merge recovery.

When building the model for object Obj1, the two losing updates will form an alternate version path Obj(2). FIG. 16 gives a graphical view of Obj1 following the merge recovery. The clients who created instance I2 and instance I3 will be notified that their updates to the principal path of Obj1 were in conflict with the updates $G_{3C,1}$, $G_{3C,2}$, and $G_{3C,3}$. The set of clients who requested the updates $G_{3C,1}$, $G_{3C,2}$, and $G_{3C,3}$ are notified of their conflict with $G_{3A,1}$ and $G_{3A,2}$. The notification would inform each client of the result of his update, specify the name that should be used to reference the update result, and identify those clients whose updates were in conflict.

with an associated partition tag of 4A or 5A. The representative for partition 7C will construct a change list containing all modifications with associated partition tags of 2C, 3C, 4B, 5B, 6C, or 7C.

From the change list information supplied by the two representatives we compute the predecessor updates and the successor updates for each reported group update. Table VI presents the information on all updates reported by the merging partitions.

TABLE VI

| Group Update | Paths Updtd | Pred. Updts. | #Pred. Updts | Succ. Updts | #Ent. Updts | Gdnss. Value |
|---|---|---|---|---|---|---|
| $G_{5A,1}$ | Obj1 | $\{G_{3A,2}, G_{3A,1}\}$ | 2 | $\{G_{5A,2}\}$ | 1 | 4 |
| $G_{5A,2}$ | Obj1 | $\{G_{5A,1}, G_{3A,2}, G_{3A,1}\}$ | 3 | $\{\}$ | 1 | 5 |
| $G_{7C,1}$ | Obj1 | $\{G_{3C,3}, G_{3C,2}, G_{3C,1}, G_{3C,1}\}$ | 3 | $\{G_{7C,2}, G_{7C,3}\}$ | 1 | 5 |
| $G_{7C,2}$ | Obj1 | $\{G_{7C,1}, G_{3C,3}, G_{3C,2}, G_{3C,1}\}$ | 4 | $\{G_{7C,3}\}$ | 1 | 6 |
| $G_{7C,3}$ | Obj1 | $\{G_{7C,2}, G_{7C,1}, G_{3C,3}, G_{3C,2}, G_{3C,1}\}$ | 5 | $\{\}$ | 1 | 7 |
| $G_{7C,4}$ | Obj1(2) | $\{G_{3A,1}, G_{3A,2}\}$ | 2 | $\{\}$ | 1 | 4 |
| $G_{3A,1}$ | Obj1(2) | $\{\}$ | 0 | $\{G_{3A,2}, G_{7C,4}\}$ | 1 | 2 |
| $G_{3A,2}$ | Obj1(2) | $\{G_{3A,1}\}$ | 1 | $\{G_{7C,4}\}$ | 1 | 3 |
| $G_{3C,1}$ | Obj1 | $\{\}$ | 0 | $\{G_{3C,2}, G_{3C,3}, G_{7C,1}, G_{7C,2}, G_{7C,3}\}$ | 1 | 2 |
| $G_{3C,2}$ | Obj1 | $\{G_{3C,1}\}$ | 1 | $\{G_{3C,3}, G_{7C,1}, G_{7C,2}, G_{7C,3}\}$ | 1 | 3 |
| $G_{3C,3}$ | Obj1 | $\{G_{3C,1}, G_{3C,2}\}$ | 2 | $\{G_{7C,1}, G_{7C,2}, G_{7C,3}\}$ | 1 | 4 |

Figure 17:
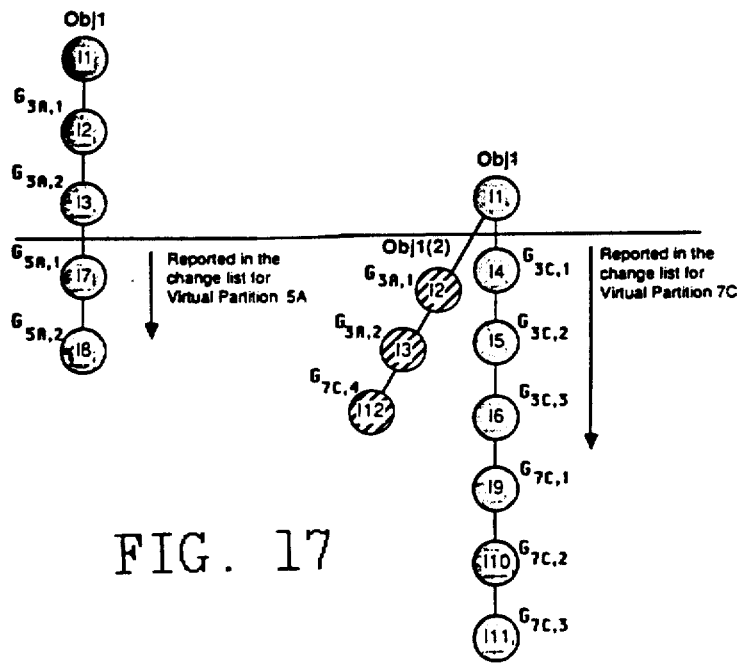
FIG. 17 is a graphical view of updates performed by two partitions on one object.

Partition 7C performs updates on Obj1 and Obj1(2). Partition 5A has no knowledge of the existence of Obj1(2), so partition 5A performs updates on Obj1 only. FIG. 17 shows the behavior of partitions 5B and 3C reported in a change list. For the example of FIG. 17:

```
Updates with partition tag value = 5A:
G5A,1 = update Obj1 = {I7}
G5A,2 = update Obj1 = {I8}
Updates with partition tag value = 7C:
G7C,1 = update Obj1 = {I9}
G7C,2 = update Obj1 = {I10}
G7C,3 = update Obj1(2) = {I12}
G3A,1 = update Obj1(2) = {I2}
G3A,2 = update Obj1(2) = {I3}
Updates with partition tag value = 3C:
G3C,1 = update Obj1 = {I4}
G3C,2 = update Obj1 = {I5}
G3C,3 = update Obj1 = {I6}
Updates with partition tag value = 5B:
None
```

The users in partition 7C performed three updates on Obj1, creating instances I9, I10, and I11 as successors of I6, and one update on Obj1(2), creating instance I12 as the successor of I3. These four new instances have associated partition tag values of 7C. The users in partition 5A performed two updates on Obj1, creating instances I7 and I8 as successors of I3. The instances I7 and I8 have associated partition tag values of 5A. We merge partition 5A and 7C to form partition 9B. Partition 5A has a partition history 1A, 2A, 3A, 4A, and 5A. Partition 7C has a partition history 1A, 2A, 3A, 2C, 3C, 4B, 5B, 6C, and 7C. The representative for partition 5A will construct a change list containing all modifications We note the following:

Goodness Value = (2 * #Entities Updated) + #Predecessor Updates

Prescribed Processing Order:

$G_{7C, 3}, G_{7c, 2}, G_{7C, 1}$, $G_{5a, 2}, G_{7C, 4}$, $G_{3C, 3}, G_{5A, 1}, G_{3C, 2}, G_{3A, 2}$, $G_{3C, 1}, G_{3A, 1}$

Winners = $\{G_{7c, 3}, G_{7c, 2}, G_{7C, 1},$ $G_{3C, 3}, G_{3C, 2}, G_{3C, 1}, G_{7C, 4}, G_{3A, 1}, G_{3A, 2}\}$ Losers = $\{G_{5A, 2}, G_{5A, 1}\}$ Note that update $G_{5A,1}$, executed in partition 5A, has 2 predecessor updates $G_{3A,2}$ and $G_{3A,1}$. These predecessor updates were reported by partition 7C. Similarly update $G_{5A,2}$ executed in partition 5A has updates $G_{3A,2}$ and $G_{3A,1}$ as predecessors. This occurs because partition 5A is not aware that the instance I3, created by $G_{3A,2}$, and the instance I2, created by $G_{3A,1}$, have been moved to an alternate version path. Update $G_{3A,1}$ and $G_{3A,2}$ are reported by partition 7C as updates to Obj1(2) rather than as updates to Obj1. This occurs as a result of the previous merge resolution.

The set of updates being considered are sorted nby their goodness values, the name of the partition reporting the update, and the group update token associated with the update. Update $G_{7C,3}$, which updates the principal path of Obj1, is the first update to be processed. This update and all of its predecessor updates ($G_{7C,2}$, $G_{7C,1}$, $G_{3C,3}$, $G_{3C,2}$, and $G_{3C,1}$) are added to the set of winning updates. The next remaining update to be considered is update $G_{5A,2}$, reported by partition 5A. $G_{5A,2}$ upates the principal path of Obj1. This update conflicts with the principal path updates reported by partition 7C. The updates reported by partition 7C for the principal path of Obj1 have been selected as winning updates; therefore, update $G_{5A,2}$ and all of its successors must be added to the set of losing updates. The update $G_{5A,2}$ has no successors. The partition tag associated with each losing update is set to 9B. The next update considered is update $G_{5A,1}$. This update, reported by partition 5A, is an update to the principal path of Obj1. The update conflicts with updates in the set of winning updates and must be added to the set of losing updates. The next update considered is update $G_{7C,4}$. This is the first update to the alternate path Obj1(2). The update does not conflict with any winning updates. The predecessors $G_{3A,1}$ and $G_{3A,2}$ update Obj1(2). None of these updates conflict with any of the winning updates. All three updates are added to the set of winning updates.

Figure 18:
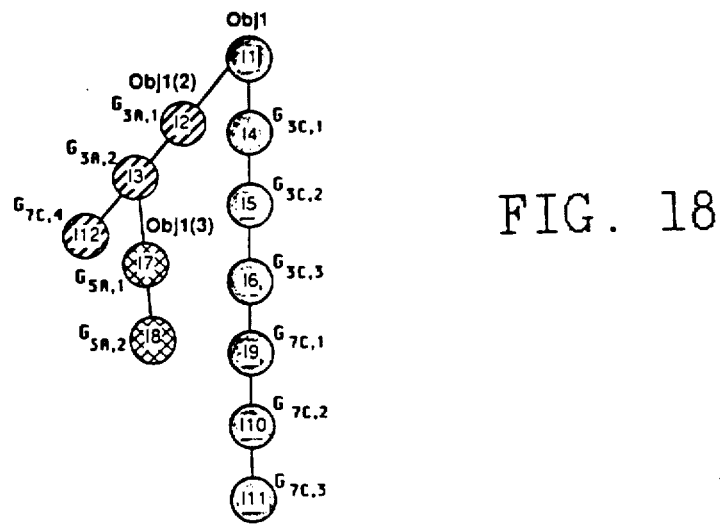
FIG. 18 is a graphical view of the object of FIG. 17 following a merge recovery.

The two losing updates $G_{5A,2}$ and $G_{5A,1}$ created temporally related instances; therefore these instances will be grouped together and placed in one new alternate path Obj1(3). FIG. 18 presents a graphical view of object Obj1 after the completion of the merge recovery. The clients who requested the losing updates to the principal path of Obj1 are notified of their conflict with the updates $G_{7C,3}$, $G_{7C,2}$, $G_{7C,1}$, $G_{3C,3}$, $G_{3C,2}$, and $G_{3C,1}$. The update $G_{5A,2}$ and $G_{5A,1}$ are in conflict with this set of updates because these are the winning update applied to the principal path of Obj1. The clients who performed the winning updates are also informed of the conflicts.

Thus has been described a data base system that can separate into a plurality of virtual partitions in response to a system component failure. Each virtual partition stores a separate instance of an initial data base including an initial set of versions of data objects, each version of a particular data object, other than a first version of the data object, being created by modifying an existing version of the data object. The initial data base in each partition also includes directory data associated with each data object of the initial set of versions of data objects. The directory data identifies non-overlapping paths of decendency for the associated data object, each path of decendency comprising sequentially created versions of the data object, wherein each data object version of the path except a first data object version of the path directly descends from a last created data object version of the path. The directory data classifies each path as one of principal and alternate, and classifies each version of each path as being one of current and non-current. However, only one path of each object is classified as principal and only one version of each path is classified as current. The initial data base also includes a set of configuration specifications, each configuration specification referencing a group of the set of data object versions using both fixed references to specific versions and floating references to a current data object versions of a particular path and/or to a current data object version of the principal path.

Each virtual partition independently executes group updates to carry out operations with respect to a group of objects referenced by a configuration specification, including for example an operation that adds a new version of a data object to a path associated with the data object directly descending from a current data object version of the path, an operation that alters classifications of paths, an operation that alters classification of data object versions, and an operation that creates a new alternate path associated with a data object by creating a new version of the data object directly descending from a noncurrent version of the data object. Each virtual partition maintains a separate change list describing all group updates that it executes.

In accordance with the invention, a particular virtual partition provides a merged data base reflecting changes to the initial data base resulting from all group updates described by change lists maintained by the separate virtual partitions. The particular virtual partition first obtains the change lists maintained by the separate virtual partitions. It then selects a collection of group updates from among all group updates described by the change lists, the collection being optimized according to predetermined criteria subject to a requirement that the collection includes no two group updates described by differing change lists of the separate virtual partitions which two group updates alter the same data object path. The partition then executes the collection of group updates in sequence with respect to the initial set of data objects to produce a resulting set of data objects. Finally the partition adds additional data object versions to alternate paths of the data objects, each additional data object version resulting from the group updates described by the change lists other than group updates included in the collection.

This method of merging data bases maintained by separate partitions preserves internal and mutual consistency of the resulting merged data base and permits previous versions of configuration specifications created by any one of the separate virtual partitions to be identified and resurrected from the merged data base.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

---

APPENDIX 1
Initiate a New Virtual Partition

Phase One:
Construct a new virtual partition name
Construct an invitation containing the new partition
name and a list of all sites in the federation
New Members = { }
Send the invitation to all known federation sites,
including the local site
Begin a timeout on the arrival of each reply
For each site invited Do
If a reply is received
Then Add the responding site's name to the set of
New Members
EndFor
Phase Two:
Construct and send a "commit" message containing the
new virtual partition name and the list of New
Member sites to the set of New Member sites

APPENDIX 2
Processing Virtual Partition Invitations

If you are in the process of joining a new virtual partition
Then Case of phase in the partition join process
Phase One:
If the new proposed name is < the older
proposed name
Then
Do not reply to this invitation
Continue processing the previous
invitation
Exit
EndIf
Phase Two:
Continue processing the previous invitation
Exit
EndCase of
EndIf
If the new proposed name > the current or older proposed
virtual partition name
Then
If the invitation's site list contains sites not known
by the local site
Then
Add the new sites to the local site's list of
sites for this federation
EndIf
If the invitation's site list is missing sites known by
the local site
Then
Do not reply to this invitation
Begin to initiate a new virtual partition
Else
Suspend processing in this federation
Send an acceptance message containing the local
virtual partition history to the proposing site
Begin a timeout on the arrival of a commit message
for this invitation
EndIf
Else
If you are not currently proposing a new partition
Then
Do not reply to this invitation
Bein to initiate a new virtual partition
EndIf
Endif

APPENDIX 3
Algorithm for Nominating a Pseudo Primary Site

If local site has agreed to nomination of another site, during
current partition, as pseudo primary site for data item
X in federation F
Then Start a timeout on the commit message for this nomination
Else:
Phase One:
Construct a multicast nomination message for the local
site and data item X in federation F
The local site votes "YES" on its own nomination
Send the nomination message to all sites in the current
virtual partition
Begin a timeout on the receipt of a reply from each site
For each reply Do
Case of Reply
"YES": Continue
"NO": Begin timeout on receipt of a better
nomination for X in F
Timeout: Initiate a new virtual partition
EndCase
EndFor
If all votes are "YES"
Then
Phase Two:
Multicast a commit message for the local site as
pseudo primary for data item X in federation F
If all acknowledgments are received
Then The local site is elected
Else Initiate a new virtual partition
Else If the time limit on receipt of a better -continued
APPENDIX 3
Algorithm for Nominating a Pseudo Primary Site nomination expires
Then Initiate a new virtual partition
EndIf
EndIf
If the time limit on receipt of a commit message has expired
Then Initiate a new virtual partition

APPENDIX 4
Algorithm for Processing a Nomination Message

Phase One:
Receive a message nominating site S as a pseudo primary
site for data item X in federation F
If the local site has committed to a different pseudo
primary site for X during the current virtual partition
Then Reply "NO"
If the local site has voted "YES" on a previous
nomination during the current virtual
partition, but has not committed to it
Then
If S is ≥ previously nominated site
Then
If the previously nominated site is the
local site
Then Begin a timeout on the commit message
Reply "YES"
Else Rely "NO"
EndIf
Else Reply "YES"
EndIf
Phase Two:
If the timeout on the commit message expires
Then Initiate a new virtual partition

APPENDIX 5
Selecting N Designated Copy Sites

If N ≥ the number of known sites in the federation
Then
Select the set of all known sites in the federation
Else
Unselected sites = {all known sites in the federation
minus the local site
Selected sites = {the local site}
For each site in the set of unselected sites Do
Set this site's preference rating to zero
EndFor
For each site in the set of unselected sites Do
If this site is a fileserver site
Then Add 3 to this site's preference rating
If this site is a member of the current virtual
partition
Then Add 3 to this site's preference rating
If the data item being replicated is NOT the
first instance in a new path or a new object
Then If this site stores a previous temporal
version of the new data item
Then Add 2 to this site's preference rating
If this site has local users that are permitted
access to this data item by private inclusion
Then Add 1 to this site's preference rating
EndFor
Order the sites having preference ratings > by decreasing
rating
Order the sites having preference ratings = by
increasing space used
Append the list ordered by space used to the end of the
first list
Add the first (N-1) sites in the total list to the set of
selected sites
Return the set of selected sites
EndIf

APPENDIX 6

Algorithm for Processing Replies to a Virtual Invitation

For each reply received Do
Locate the sequence number information for the partition history in this reply
For each pair <A, N> in this reply Do
Locate the information triple for the site A specified in the pair
If the triple is not found or the triple's sequence number ≠ reported sequence number
Add the reporting site's name S to the pair
Add this new triple <A, N, S> to the information for this partition history
EndIf
EndFor
EndFor
For each distinct partition history Do
For each site A reported in any triple <A, N, S> associated with this partition history Do
Add to the commit message the triple having the largest value of N
EndFor
EndFor

APPENDIX 7

Algorithm for Processing Sequence Numbers in Divergence Recovery

For each triple <A, N, S> in the commit message Do
If the sequence number N is > the multicast message sequence number in the local multicast message log for site A
Then
Request a copy of the missing multicast message from site S
Log the multicast message
Process the multicast message
EndIf
EndFor

APPENDIX 8

Algorithm for Committing a Divergence Recovery

Receive the commit message for a new virtual partition
If all sites in new partition report same partition history
Then
For each triple <A, N, S> in the commit message Do
If sequence number N is > multicast message sequence number in local multicast message log for site A
Then
Request copy of missing multicast message from site S
Log the multicast message
Process the multicast message
EndIf
EndFor
For each lock held as a primary site Do
If the lock was requested by a site that is not a member of the new virtual partition
Then Release the lock
EndFor
For each locally suspended request in the recovering federation Do
If this request has not multicast its results yet
Then If this request has requested lock from site that is not a member of new virtual partition
Then Backout the processing of this request
EndIf
EndIf
If local site was name server site for previous partition
Then
For each name reservation Do
If the name was reserved by a site that is not a member of the new virtual partition
Then Release the name reservation
EndFor
EndIf
Commit to membership in the new virtual partition
EndIf

APPENDIX 9

Algorithm for Crash Site Recovery

Perform a physical readability test on the system directory for media failure
If the directory is not found
Then Create an empty directory and wait for client requests
If some portion of the directory is not readable
Then
Read and cache all readable federation, site, and user records from the directory
For each unique federation Do
Execute an enroll request for each user in this federation
EndFor
EndIf
If all parts of the directory are readable
For each request recorded in the undo/redo log Do
If the request has not been committed and multicast
Then
Remove all results of the request from the local system directory
Mark this request log entry for redo
EndIf
EndFor
If the previous virtual partition was not a singleton partition
Then Construct a new virtual partition name (previous level# + 2, local site)
Construct a retag partition name (current partition level# - 1, local site)
For each multicast message log entry Do
If the multicast message results have not been previously retagged
Then
Retag these multicast results with the retag partition name
Mark the multicast message log entry as retagged
EndIf
EndFor
Commit to a single site virtual partition
Activate the finder to locate other sites using liveness messages
For each entry in the undo/redo log Do
If the entry is marked for redo
Then
Redo the request
Unmark the log entry
EndIf
EndFor
EndIf

APPENDIX 10

Algorithm for Detecting Failure Correction

For each federation known by the local site Do
If this federation is currently in recovery
Then Skip this federation
Else
New excluded sites = {sites that are members of this federation and are not member of this federation's current virtual partition}
Order the new excluded sites by name
If the set of new excluded sites = the previous set of excluded sites
Then
Determine which site was the destination of the last liveness message
Send a liveness message to the next site in the ordered set
Mark the destination site as the last destination of a liveness message
Else
Send a liveness message to the first site in the ordered set
Mark the first site as the last destination of a liveness message
EndIf
EndIf
EndFor

APPENDIX 11

Algorithm for Processing a Partition Commit Message

Receive the commit message for a new virtual partition
If multiple partition histories are reported
Then
Perform propagation of multicast messages as in
divergence recovery
For each entry in the undo/redo log Do
Remove all results of the uncommitted requests from
the local system directory
Mark the entry for redo
EndFor
Clear locks held by the local site for federation
Clear name reservations held by local site for federation
If the local site is designated as a representative
Then
Calculate the tag set for the partition being represented
Scan the local system directory and construct
a change list
EndIf
For each virtual partition history in this merge Do
Obtain the change list from the representative for
this partition history
EndFor
Perform resolution on the set of change lists and
incorporate the results into the local system directory
Commit to membership in the new virtual partition
For each entry in the undo/redo log Do
If the entry is marked for redo
Then
Redo this request
Unmark this undo/redo log entry
EndIf
EndFor
EndIf

APPENDIX 12

Algorithm Used by Representative Sites to Calculate A Tag Set

Let N be the number of partitions in this merge
Order the merging partitions by their current virtual partition
name
Let J be the position of the local site's partition in the
ordering
Let I =

$$\left\{ \begin{array}{l} (J-N,1) \\ \bigcap_{i=(1,J+1)} \end{array} \begin{array}{l} [\text{VPH}[\text{local site's partition}]- \\ \text{VPH}[\text{ith merging partition}]] \end{array} \right\}$$

Let U =

$$\left\{ \begin{array}{l} N \\ \bigcup_{i=1} \end{array} \begin{array}{l} [\text{VPH}[\text{local site's partition}]- \\ \text{VPH}[\text{ith merging partition}]] \end{array} \right\}$$

If U ≠ I
Then For i = (J + 1) to N Do
If (U ∩ VPB(ith merging partition) ≠ {})
Then U = U-VPH(ith merging partition)
EndFor
EndIF
The local site's tag set = U

APPENDIX 13

General Algorithm for Processing Change Lists

For each change list Do
While this change list contains group update
information Do
Read and save the information
EndWhile
EndFor
Determine the smallest object token not yet processed by the
merge, call it 0
Consider the object set for 0 from each change list that
reports on object 0
Create an empty model for the object 0
For each non-conflicting change Do

APPENDIX 13-continued

General Algorithm for Processing Change Lists

Add the results of the change to the model records
for object 0
Copy all associated partition tag values into the
model records
EndFor
For each set of conflicting changes Do
Resolve the conflict
Add the results of the conflict resolution to the
model records for the object 0
Set all associated partition tag values in the model
records to the name of the newly formed virtual
partition
EndFor
For each record in the model Do
Incorporate the model for object 0 into the local
system directory
EndFor

APPENDIX 14

Algorithm for incorporating a model into the system directory

For each record in the model Do
If the corresponding record exists in the local
system directory
Then
Read the local record
For each partition tag field in the model
record Do
If the partition tag field value is in the
set of tags of interest
Then Copy from the model record into the
local record the field(s) associated with
this partition tag field and the partition
tag field
EndFor
Write the modified local record to the local directory
Else
If the record contains fields of local
significance only
Then Fill these fields in the model record with
default values
Add the model record, as is, to the local directory
EndIf
EndFor

APPENDIX 15

Algorithm for Resolving Assign Conflicts

Select the assign result with the largest associated
partition tag
Set the principal path in the model to the selected
assigned path
Set the associated partition tag field to the name of the
newly formed virtual partition

APPENDIX 16

Algorithm for Resolving Ownership Conflicts

If there are new owner conflicts on the object
Then Add to the model object record the new owner with
the largest associated partition tag value and the new
virtual partition name
EndIf
For each object path that appears in any change list Do
Case of conflicts
New Owner and Usurp Conflicts:
If there was a new owner conflict for the object
Then Add to the model path record new path owner
resulting from the new_owner or usurp request
performed in same partition as the new owner
for the object and new virtual partition name
Else Add to the model path record new owner with
the largest associated partition tag value and
the new virtual partition name
EndIf
Usurp Conflicts:

APPENDIX 16-continued

Algorithm for Resolving Ownership Conflicts

If there was a new owner conflict for the object
Then Add to the model path record new path owner
resulting from usurp performed in the same
partition
as new owner for object and new virtual partition
name
Else Add to the model path record the new path
owner
resulting from usurp with largest associated
partition
tag value and the new virtual partition name
EndIf
New Owner Conflicts:
If there was a new owner conflict for the object
Then Add to the model path record the new path
owner resulting from the new owner request
performed in the same partition as the new owner
for the object and the new virtual partition name
Else Add to model path record new path owner
resulting from the new owner request having
largest associated partition tag value and new
virtual partition name
EndIf
EndCase
EndFor

APPENDIX 17

Algorithm for Resolving Permission Conflicts

Build a new inclusion list as follows:
For each entry in the inclusion list Do
If model already contains inclusion entry for user
Then
Union specified operation permissions together
If the entry is marked as deleted
Then Mark the entry in the model as deleted
EndIf
EndFor
Build a new exclusion list as follows:
For each entry in the exclusion list Do
If model already contains an exclusion entry for user
Then
Union the specified operation permissions together
If the entry is marked as deleted
Then Mark the entry in the model as deleted
EndIf
EndFor
If only one set_permission request reported in change lists
Then Add the resulting general permission setting to the model
Else
If any one of conflicting permission settings is private
Then Add the permission setting private to the model
Else If any one of conflicting permission settings is
private-include
Then Add permission setting private-include to model
Else If any one of the conflicting permission
settings is public-exclude
Then Add permission setting public-exclude
to the model
Else Add permission setting public to the model
EndIf
EndIf
EndIf
EndIf

APPENDIX 18

Algorithm for Resolving Duplicate Implicit Alias Numbers

Determine the maximum implicit alias number used in object O,
call it $A_e$
If there are any duplicate alias numbers associated with
distinct model paths
Then
Determine the maximum alias number not duplicated
in any of the change list records for object O,
call it $A_b$
Let MaxAlias = $A_e$
For A = ($A_b$ + 1) to $A_e$ Do

APPENDIX 18-continued

Algorithm for Resolving Duplicate Implicit Alias Numbers

Let P be the set of distinct model paths claiming A
as their alias number
Order the set P in descending order by the name of
the partition that created the path
For the first model path in the set P set the alias
number to be A
Set the associate partition tag field to the name
of the newly formed virtual partition
For the remaining paths in the ordered set P Do
Increment MaxAlias
In the model record for this path, set the alias
number to MaxAlias
Set the associate partition tag field to the name
of the newly formed virtual partition
EndFor
EndFor
EndIf

APPENDIX 19

Algorithm for Physically Deleting Logically Deleted Data

If the partition commit message specifies that all sites in
a federation F have agreed to join new virtual partition
Then
If a new recovery begins
For each entry in the multicast message log Do
Unmark the entry for being received after a full
merge
EndFor
Exit
Else
For each multicast message received Do
Perform normal processing of the multicast message
Mark this multicast log entry as received after
full merge
If the multicast log entry for each site is marked
as received after full merge and the local
site has sent a multicast message
Then Perform physical deletion on deleted entities
EndIf
EndFor
EndIf
EndIf

APPENDIX 20

Algorithm for Resolving Conflicting Deletions and Updates

If the conflict is (erase all, update)
Then
Locate this update in the control information for
group updates
Mark the update and all of its successor updates as
losing updates
Mark the model path record as deleted
EndIf
If the conflict is (delete, update)
Then
Mark the model object record as undeleted
When incorporating the object record Do
If the object record exists locally and is
logically deleted
Then Undelete the object record
Else Add the object record to the local
system directory
EndWhen
EndIf

APPENDIX 21

Algorithm for Calculating the Predecessor Updates for a Group Update

Calculate Predecessor Set for a group update G
Predecessor Set for a group update G is $$\bigcup_{j=1}^{N} \text{Pred\_Updates}(I_j)$$

APPENDIX 21-continued

Algorithm for Calculating the Predecessor Updates for a Group Update where $G$ = update $I_1, I_2, \ldots, I_N$.
Calculate Predecessor Updates for an instance I in a path X
Consider the group update control information from all of the merging partitions
Constructed an ordered set Pred as follows
Initialize Pred to the instance I created by $G_{i,j}$ in path X
Repeat
If the predecessor of the last instance in the Pred set is reported by any merging partition
Then Add that predecessor as the new last member of the Pred set
Until the size of the Pred set does not increase
Set Pred_Updates for instance I to be the empty set
For each instance in the Pred set Do
Pred_Updates = Union of Pred_Updates and the group update that created this instance
EndFor

APPENDIX 22

Algorithm for Selecting Winning Group Updates

Let group update $G_{i,j}$ be the jth update in the change list of partition $P_i$
Define PredUpdate($G_{i,j}$) = {$G_{a,b}$ | $G_{a,b}$ created a predecessor instance for one or more instances created by $G_{i,j}$ and $P_a$ is one of the merging partitions}
Define SuccUpd($G_{i,j}$) = {$G_{i,k}$ | $G_{i,k}$ created a successor instance for one or more of instances created by $G_{i,j}$ and reported by $P_i$ as an instance of the same version path}
Associate with each group update $G_{i,j}$ a count
For each $G_{i,j}$ Do
Set $G_{i,j}$'s associated count to two times the number of objects updated by $G_{i,j}$ plus the number of updates in PredUpdate($G_{i,j}$)
EndFor
Sort the $G_{i,j}$'s in descending order by their associated counts
use virtual partition name as a second key and the group update token as a third key
Winners = { }
Losers = { }
For each $G_{i,j}$ in descending order Do
If the current $G_{i,j}$ and all updates in PredUpdate($G_{i,j}$) do not conflict with any $G_{r,s}$ (i $\neq$ r) in Winners
Then
Mark the control information for $G_{i,j}$ and PredUpdate($G_{i,j}$) to be winning updates
Remove $G_{i,j}$ and PredUpdate($G_{i,j}$) from the sorted update list
Else
Mark the control information for $G_{i,j}$ and SuccUpd($G_{i,j}$) to be losing updates
Remove $G_{i,j}$ and SuccUpd($G_{i,j}$) from the sorted update list
EndIf
EndFor

APPENDIX 23

Algorithm for Merging Update Results for an Object O

Calculate A = the largest implicit alias number used in object O
For each updated path from any change list (by increasing path token) Do
Set No_Winner to TRUE
Set Winning_Partition to NULL
Set Last_Non_Type1_Update_Partition to NULL
For each updating partition (by decreasing partition name) Do
Consider the oldest instance record reported in this partition's version of this path
Look up the group update token associated with this instance record in the group update control information
If the update is a winner
Then Set No_Winner to FALSE
Set Winning_Partition to this partition name
If this update is NOT processed by group update rule #1
Then Set Last_Non_Type1_Update_Partition to this partition name
EndFor
For each updating partition (by decreasing partition name) Do
If this partition is the Winning_Partition
Then Add the path record to the model, if not present
While the update is a winner and there is a new instance in this partition's version of this path Do
Add the instance record to the model, if not present
Make this instance current of the model path
If there is a successor instance in this version of the path
Then Look up the next group update token in the control information
EndWhile
Else If No_Winner AND the partition is the Last Non_Type1_Update_Partition
Then Add the path record to the model, if not present
While there is a new successor instance in this partition's version of this path and the update was not processed by update rule #1 Do
Add the instance record to the model, if not present
Make this instance the current of the model path
If there is a successor instance in this version of the path
Then Look up the next group update token in the control information
EndWhile
EndIf
EndIf
If any updates remain in this partition's version of this path
Then Make a new path record and add it to the model
Increment A and assign the new implicit alias number to this path
For each instance record in this partition's version of this path in successor order Do
Add the instance record to the model, if not present
Make this instance the current of the new model path
Make this instance record reference the new path record as its path
EndFor
Assign the new path a token = (last instance token's # + 1, sitename)
EndIf
EndFor
EndFor

I claim:

1. For a data base system providing a plurality of separate virtual partitions, each storing separate instances of an initial data base comprising an initial set of versions of data objects and initial directory data indicating primary and alternate paths of decendency relating successive versions of each data object, each virtual partition independently executing group updates with respect to a referenced group of data objects by adding descendant data object versions to paths of data objects of the referenced group, each virtual partition maintaining a separate change list describing all group updates that it executes, a method for execution by a virtual partition for providing a merged data base reflecting changes to the initial data base resulting from group updates described by change lists maintained by said plurality of separate virtual partitions, the method comprising the steps of:

selecting a collection of group updates from among the group updates described by said change lists according to predetermined selection criteria subject to a restriction that when the collection includes a plurality of group updates adding data object versions to any one path of a data object, said plurality of group updates must all be described by a change list maintained by one of said plurality of separate virtual partitions;

executing the collection of group updates on versions of data objects included in said initial data base to produce a resulting set of data object versions;

generating additional data object versions, each additional data object version resulting from group updates described by said change lists other than group updates included in said collection; and altering said initial directory data so that it indicates that the additional data object versions relate to data object versions of said resulting set by alternate paths of decendency.

2. The method of claim 1 wherein selection of the collection of group updates is subject to an additional restriction that a data object version created by a group update of the collection other than a first version of a data object must be created either by modifying a data object version created by another group update of the collection or by modifying a data object version of the initial set.

3. The method of claim 1 wherein said predetermined criteria comprises maximization of a number of group updates included in the collection, subject to said restriction.

4. The method of claim 1 wherein said predetermined criteria comprises maximization of a number of data object paths altered by group updates included in the collection, subject to said restriction.

5. The method of claim 1 wherein said predetermined criteria comprises maximization of a number of versions created by executing group updates included in the collection, subject to said restriction.

6. The method of claim 1 wherein said predetermined criteria comprises maximization of a weighted combination of a number of paths altered by group updates included in the collection and of a number of group updates included in the collection, subject to said restriction.

7. For a data base system providing a plurality of separate virtual partitions, each storing separate instances of an initial data base comprising an initial set of versions of data objects, each version of a particular data object, other than a first version of the data object, having been created by modifying an existing predecessor version of the data object, the initial data base further comprising directory data associated with each data object of the initial set of versions of data objects, the directory data identifying paths of decendency for the associated data object, each path of decendency comprising sequentially created versions of the data object, wherein each data object version included in a path except a first data object version of the path directly descends from a last created data object version included in the path, the directory data classifying each data object version included in each path as being one of current and non-current, wherein only one data object version in each path is classified as current, each virtual partition independently executing group updates by carrying out operations with respect to a referenced group of data objects such that a path of a data object of the group is altered, and each virtual partition maintaining a separate change list describing all group updates that it executes, a method for execution by a virtual partition for providing a merged data base reflecting changes to the initial data base resulting from all group updates described by change lists maintained by said plurality of separate virtual partitions, the method comprising the steps of:

selecting a collection of group updates from among all group updates described by said change lists according to predetermined selection criteria subject to a restriction that when the collection includes a plurality of group updates altering any one path of a data object, said plurality of group updates must be described by a change list maintained by one of said plurality of separate virtual partitions;

executing the collection of group updates in sequence on said initial set of data objects to produce a resulting set of data objects; and adding additional data object versions to alternate paths of the resulting set of data objects, each additional data object version resulting from group updates described by said change lists other than group updates included in said collection.

8. The method of claim 7 wherein selection of the collection of group updates is subject to an additional restriction that a successor data object version created by a group update of the collection must be created either by modifying a data object version created by another group update of the collection or by modifying a data object version of the initial set.

9. The method of claim 7 wherein said predetermined criteria comprises maximization of a number of group updates included in the collection, subject to said restriction.

10. The method of claim 7 wherein said predetermined criteria comprises maximization of a number of data object paths altered by group updates included in the collection, subject to said restriction.

11. The method of claim 7 wherein said predetermined criteria comprises maximization of a number of versions created by executing group updates included in the collection, subject to said restriction.

12. The method of claim 7 wherein said predetermined criteria comprises maximization of a weighted combination of a number of paths altered by group updates included in the collection and of a number of group updates included in the collection, subject to said restriction.

13. For a data base system providing a plurality of separate virtual partitions, each storing separate instances of an initial data base comprising an initial set of versions of data objects, each version of a particular data object, other than a first version of the data object, being created by modifying an existing predecessor version of the data object, the initial data base further comprising an initial set of directory data associated with each data object of the initial set of versions of data objects, the directory data identifying paths of decendency for the associated data object, each path of decendency comprising sequentially created versions of the data object, wherein each data object version of the path except a first data object version of the path directly descends from a last created data object version of the path, the directory data classifying each path as one of principal and alternate, and classifying each ata object version of each path as being one of current and non-current, wherein only one path of each object is classified as principal and only one data object version of each path is classified as current, the initial data base further comprising an initial set of configuration specifications, each configuration specification referencing a group of said initial set of data object versions, at least one configuration specification providing at least one floating reference to a current data object version of a principal path of a data object, and each virtual partition independently executing group updates, each group update carrying out at least one of a set of operations with respect to a group of data objects referenced by a configuration specification, the set of operations including an operation that adds a new version of a data object to a path associated with the data object directly descending from a current data object version of the path, an operation that alters classifications of paths, an operation that alters classification of data object versions, and an operation that creates a new alternate path associated with a data object by creating a new version of the data object directly descending from a noncurrent version of the data object, and each virtual partition maintaining a separate change list describing all group updates that it executes, a method executed by a particular virtual partition for providing a merged data base reflecting changes to the initial data base resulting from all group updates described by change lists maintained by the separate virtual partitions, the method comprising the steps of:

obtaining said change lists maintained by the separate virtual partitions;

selecting a collection of group updates from among all group updates described by said change lists according to predetermined selection criteria subject to a requirement that the collection includes no two group updates described by differing change lists of the separate virtual partitions which two group updates alter a same data object path;

executing the collection of group updates in sequence on said initial set of versions of data objects to produce a resulting set of data objects; and adding additional data object versions to alternate paths of the resulting set of data objects, each additional data object version resulting from group updates described by said change lists other than group updates included in said collection.

14. The method of claim 13 wherein selection of the collection of group updates is subject to an additional restriction that a successor data object version created by a group update of the collection must be created either by modifying a data object version created by another group update of the collection or by modifying a data object version of the initial set.

15. The method of claim 13 wherein said predetermined criteria comprises maximization of a number of group updates included in the collection, subject to said requirement.

16. The method of claim 13 wherein said predetermined criteria comprises maximization of a number of data object paths altered by group updates included in the collection, subject to said requirement.

17. The method of claim 13 wherein said predetermined criteria comprises maximization of a number of versions created by executing group updates included in the collection, subject to said requirement.

18. The method of claim 13 wherein said predetermined criteria comprises maximization of a weighted combination of a number of paths altered by group updates included in the collection and a number of group updates included in the collection, subject to said requirement.

* * * * *